United States Patent
Byun et al.

(10) Patent No.: US 10,367,630 B2
(45) Date of Patent: Jul. 30, 2019

(54) METHOD AND DEVICE FOR PERFORMING COMMUNICATION USING PLURALITY OF SUBFRAMES IN TDD-BASED WIRELESS COMMUNICATION SYSTEM

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 15/577,950

(22) PCT Filed: Nov. 9, 2015

(86) PCT No.: PCT/KR2015/012012
§ 371 (c)(1),
(2) Date: Nov. 29, 2017

(87) PCT Pub. No.: WO2016/199989
PCT Pub. Date: Dec. 15, 2016

(65) Prior Publication Data
US 2018/0294942 A1   Oct. 11, 2018

Related U.S. Application Data

(60) Provisional application No. 62/173,962, filed on Jun. 11, 2015.

(51) Int. Cl.
*H04L 5/14*   (2006.01)
*H04W 72/04*   (2009.01)
*H04L 5/00*   (2006.01)

(52) U.S. Cl.
CPC .............. *H04L 5/14* (2013.01); *H04L 5/1469* (2013.01); *H04W 72/0446* (2013.01);
(Continued)

(58) Field of Classification Search
None
See application file for complete search history.

(56) References Cited

U.S. PATENT DOCUMENTS

2009/0219875 A1   9/2009 Kwak et al.
2014/0146696 A1*  5/2014 Lin ...................... H04W 72/12
                                                  370/252
(Continued)

FOREIGN PATENT DOCUMENTS

WO   2014060010   4/2014

*Primary Examiner* — Kouroush Mohebbi
(74) *Attorney, Agent, or Firm* — Dentons US LLP

(57) ABSTRACT

Provided are a method and device for performing communication using a plurality of subframes in a time division duplex (TDD) based wireless communication system. Specifically, groups are set by grouping a first configuration and a second configuration which arrange at least one downlink symbol and at least one uplink symbol in a subframe unit. The first configuration and the second configuration are configured in a manner that the downlink symbol and the uplink symbol do not overlap with each other in a particular symbol interval. Information indicative of a group is transmitted to a terminal for at least one subframe from among the plurality of subframes. Information indicative of a configuration to be used in the terminal of the first configuration and the second configuration in a group with respect to at least one subframe is transmitted to the terminal.

11 Claims, 27 Drawing Sheets

Configuration 0

(52) U.S. Cl.
CPC .......... *H04L 5/0055* (2013.01); *H04L 5/0057* (2013.01); *H04W 72/042* (2013.01)

(56) References Cited

U.S. PATENT DOCUMENTS

| | | |
|---|---|---|
| 2014/0198664 A1 | 7/2014 | Chen et al. |
| 2015/0043392 A1 | 2/2015 | Susitaival et al. |
| 2016/0080133 A1* | 3/2016 | Golitschek Edler von Elbwart ............ H04W 72/0446 370/280 |

* cited by examiner

Configuration 1

Configuration 2

Configuration 1

Configuration 1B

Configuration 2

| BS | G3 | G2 | G0 |    |    | G1 | G3 | G2 |    |
|----|----|----|----|----|----|----|----|----|----|
| A1 | G3 |    |    |    |    | G1 |    |    |    |
| A2 | G3 |    | G0 |    |    | G1 |    | G2 |    |
| B1 |    | G2 | G0 |    |    |    | G3 | G2 |    |
| B2 |    | G2 |    |    |    |    | G3 |    |    |

METHOD AND DEVICE FOR PERFORMING COMMUNICATION USING PLURALITY OF SUBFRAMES IN TDD-BASED WIRELESS COMMUNICATION SYSTEM

CROSS-REFERENCE TO RELATED APPLICATIONS

This application is the National Stage filing under 35 U.S.C. 371 of International Application No. PCT/KR2015/012012, filed on Nov. 9, 2015, which claims the benefit of U.S. Provisional Application No. 62/173,962 filed on Jun. 11, 2015, the contents of which are all hereby incorporated by reference herein in their entirety.

BACKGROUND OF THE INVENTION

Field of the Invention

The present specification relates to wireless communication, and more particularly, to a method for performing communication using a plurality of subframes in a TDD-based wireless communication system, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each terminal within a cell through scheduling. The terminal may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, the time taken for control information or data user to be transmitted on a single subframe is a transmission time interval (TTI). In general, the length of a single subframe is 1 ms. However, a next-generation wireless communication system for responding to a change of a higher data rate and a faster channel environment attempts to achieve latency of 1 ms on a user plane. That is, a TTI having a length of 1 ms has a structure not suitable for low latency requirements in a next-generation wireless communication system. Accordingly, there is a need for a method for disposing a radio resource structure for satisfying lower latency by controlling a short TTI subdivided from the existing TTI.

SUMMARY OF THE INVENTION

The present specification provides a method and a device for performing communication using a plurality of subframes in a time division duplex (TDD)-based wireless communication system.

Further, the present specification provides a method and a device for allocating a hybrid automatic repeat request (HARQ) resource using a physical HARQ indicator channel (PHICH) or uplink (UL) grant.

The present specification proposes a method for performing communication using a plurality of subframes in a TDD-based wireless communication system.

First, according to the definition of terms, a first base station (BS) is a BS of a serving cell and a second BS is a BS of a cell adjacent to the serving cell. A terminal may be a terminal included in the coverage of the first BS or may be a terminal included in the coverage of the second BS. A symbol may be an orthogonal frequency division multiplexing (OFDM) symbol or a single carrier frequency division multiple access (SC-FDMA) symbol.

The first BS sets a group by grouping a first configuration, in which at least one downlink symbol and at least one uplink symbol are arranged in each subframe, and a second configuration, in which at least one downlink symbol and at least one uplink symbol are arranged in each subframe. That is, one subframe corresponds to one transmission time interval (TTI), and one TTI includes a sTTI as a time unit obtained by subdividing the TTI. Here, a subframe is a TDD subframe, and a sTTI is defined as a scheduling unit for data transmission in order to achieve a user-plane latency of 1 ms. Therefore, in the first and second configurations provided by the subframe, a downlink sTTI including at least one downlink symbol and an uplink sTTI including at least one uplink symbol may be arranged. Also, the first and second configurations include a guard period (GP) between the at least one downlink symbol and the at least one uplink symbol.

Here, the first and second configurations need to be grouped such that the downlink symbols and the uplink symbols do not overlap with each other in a specific symbol period. The downlink symbols and the uplink symbols may be separated not to overlap with each other using the GPs in the first configuration and the second configuration. Specifically, the first and second configurations need to be grouped such that the at least one downlink symbol of the first configuration and the at least one downlink symbol of the second configuration are arranged in a first symbol period, the GP of the first configuration and the at least one downlink symbol of the second configuration are arranged in a second symbol period, the at least one uplink symbol of the first configuration and the GP of the second configuration are arranged in a third symbol period, and the at least one uplink symbol of the first configuration and the at least one uplink symbol of the second configuration are arranged in a fourth symbol period. The first symbol period, the second symbol period, the third symbol period, and the fourth symbol period are combined into a symbol period of one subframe.

The GPs generally include two symbols. However, in a particular case, in order to achieve a user-plane latency of 1 ms for a signal transmitted via the first downlink sTTI of the first and second configurations, the GPs may include only one symbol by bringing the last uplink sTTI of the first and second configurations forward by one symbol. Here, the last symbol of the first configuration and the second configuration may include an uplink pilot time slot (UpPTS) back.

Also, a downlink control channel received during a downlink sTTI may schedule an uplink channel received during an uplink sTTI. The downlink control channel may be a short physical downlink control channel (sPDCCH). However, it is also possible to schedule the uplink channel using a downlink pilot time slot (DwPTS) in order to reduce overhead for the uplink channel scheduling of the sPDCCH.

The first BS transmits, to a terminal, information indicating the group used for at least one of a plurality of subframes. The group is a group set in step S2610. The group may be designated for the at least one subframe through coordination between the first BS and the second BS. Information indicating that the group is designated for the at least one subframe is semi-statically transmitted via radio resource control (RRC). That is, the first BS designates and reports the group for each of the plurality of subframes to the terminal.

When the first BS designates the group in coordination with the second BS and the terminal is included in the coverage of the second BS, the first BS transmits, to the second BS, information indicating the group used for the at least one subframe among the plurality of subframes. That is, a serving cell of the first BS directly reports the information to a neighboring cell of the second BS.

When the first BS and the second BS do not cooperate, the group may be designated for the at least one subframe through channel quality information (CQI) of the terminal.

The first BS transmits, to the terminal, information indicating a configuration for the at least one subframe to be used for the terminal among the first configuration and the second configuration in the group. The configuration for the at least one subframe is dynamically reported through a common control channel. That is, the first configuration or the second configuration, in which no interference can occur, is designated for a particular subframe, thereby preventing interference between the serving cell of the first BS and the neighboring cell of the second BS.

Here, when the first BS designates the group in coordination with the second BS and the terminal is included in the coverage of the second BS, the first BS also transmits, to the second BS, the information indicating the configuration for the at least one subframe to be used for the terminal among the first configuration and the second configuration in the group.

In addition, the present specification proposes a BS that performs communication using a plurality of subframes in a TDD-based wireless communication system. The BS includes a radio frequency (RF) unit to transmit and receive a radio signal and a processor connected to the RF unit. The processor sets a group by grouping a first configuration, in which at least one downlink symbol and at least one uplink symbol are arranged in each subframe, and a second configuration, in which at least one downlink symbol and at least one uplink symbol are arranged in each subframe. The processor transmits, to a terminal, information indicating the group used for at least one of a plurality of subframes. The processor transmits, to the terminal, information indicating a configuration for the at least one subframe to be used for the terminal among the first configuration and the second configuration in the group.

Applying a TDD-based sTTI structure makes it possible to reduce a scheduling unit, thereby achieving a user-plane latency of 1 ms. Further, unlike an FDD-based sTTI structure in which uplink/downlink resources are fixed, it is possible to adjust uplink/downlink resources according to the amount of uplink/downlink traffic of a low-latency service. In addition, when a TDD configuration is changed for each subframe, TDD configurations that cause less interference are grouped using a GP and a TDD configuration is dynamically selected from a corresponding group, thereby reducing interference between cells. Moreover, when a TDD configuration is changed for each subframe, a retransmission resource is allocated using a PHICH, thereby performing uplink retransmission with small overhead in a short time.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
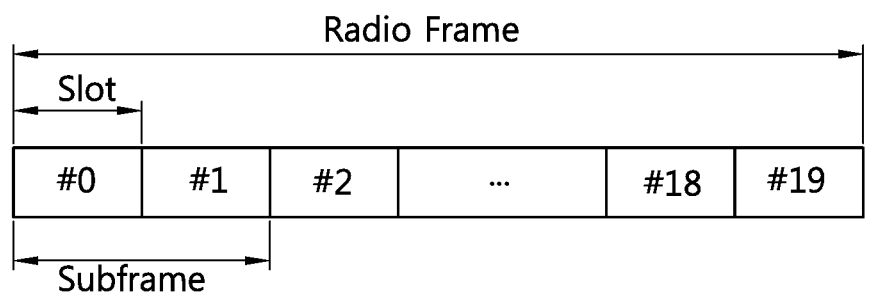
FIG. 1 shows a structure of a radio frame in 3GPP LTE.

FIG. 1 shows a structure of a radio frame in 3GPP LTE.

Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
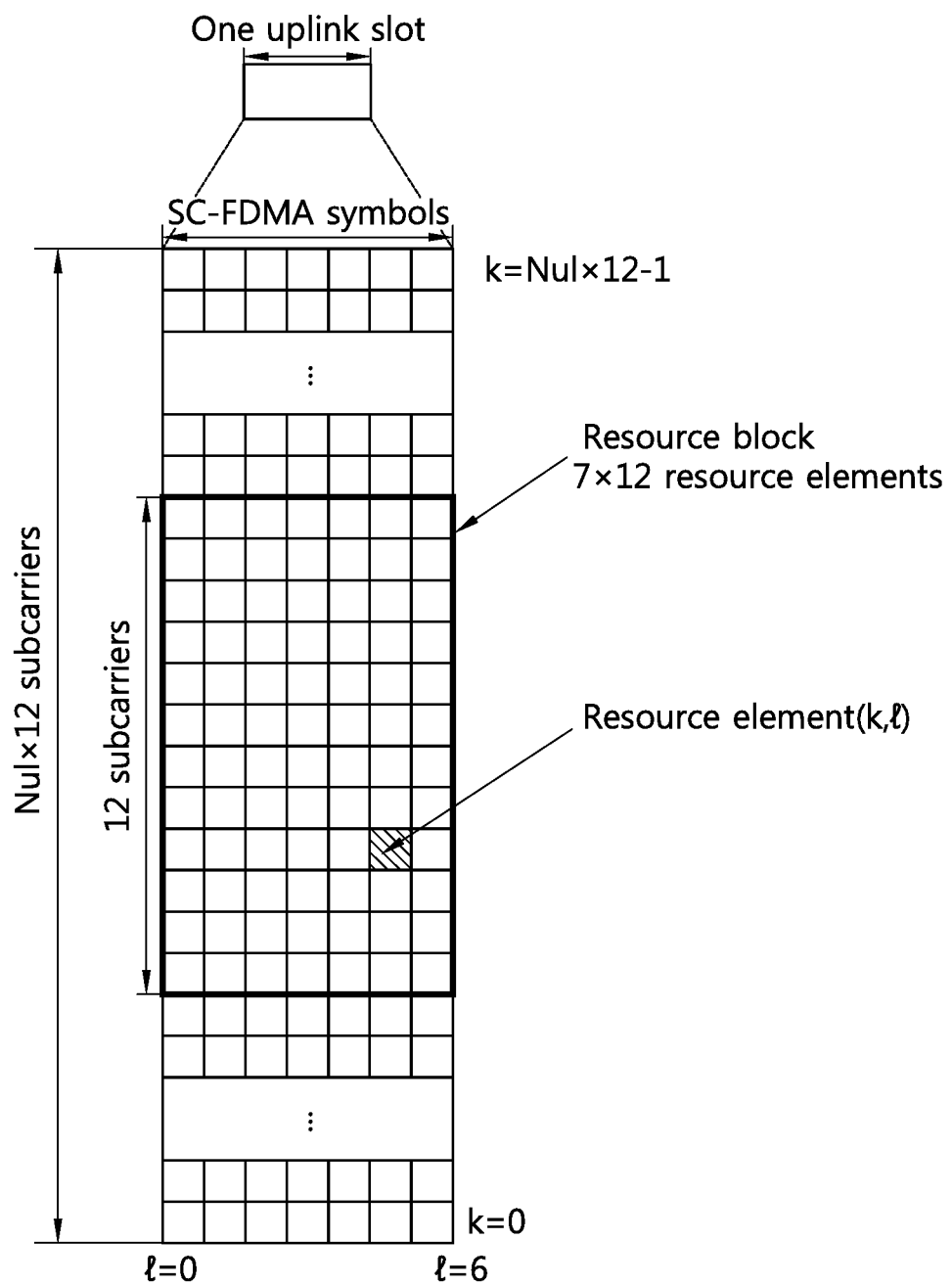
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The terminal may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12-1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
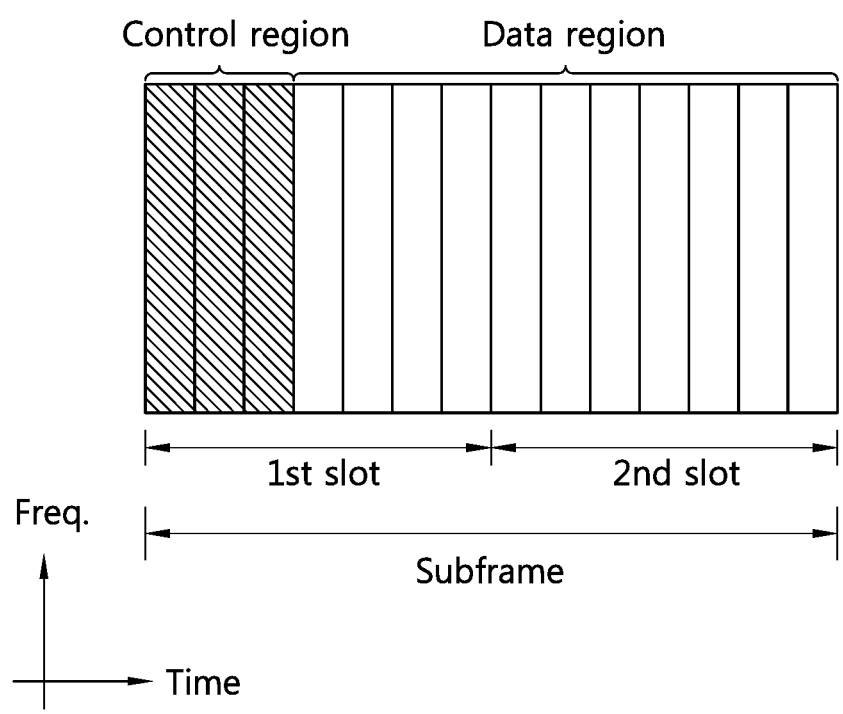
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. A terminal may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

A next-generation wireless communication system aims at a user-plane latency of 1 ms in order to provide a low-latency service. To achieve a user-plane latency of 1 ms, the length of a conventional TTI that is 1 ms needs to be reduced, because user-plane latency includes not only the length of the conventional TTI but also encoding time and decoding time. The user-plane latency in the 3GPP LTE system is about 4.8 ms (encoding time=decoding time=1.5 ms, the length of conventional TTI=1 ms, target BLER=10%).

Here, when a sTTI obtained by reducing the conventional TI has a length of one to three OFDM symbols, user-plane latency can be 1 ms. This is because the conventional TTI needs to be about 1/4.8=0.21 ms in order to achieve a user-plane latency of less than 1 ms. However, when the sTTI has a length of four or more OFDM symbols, it is impossible to achieve a user-plane latency of 1 ms, because a sTTI of four or more OFDM symbols is 0.28 ms or longer. Here, it is assumed that encoding/decoding time decreases in proportion to a reduced length of the TTI.

Here, it may be considered that a frame corresponds to the length of the conventional TTI (14 OFDM symbols) and a subframe corresponds to the length of the sTTI (3 OFDM symbols). In addition, it may be considered that a subframe corresponds to the length of the conventional TTI (14 OFDM symbols), and a scheduling unit for actual data transmission is the sTTI (3 OFDM symbol lengths). The following description will be made on the assumption that a subframe corresponds to the length of the conventional TTI and a scheduling unit for actual data transmission is the sTTI.

Figure 4:
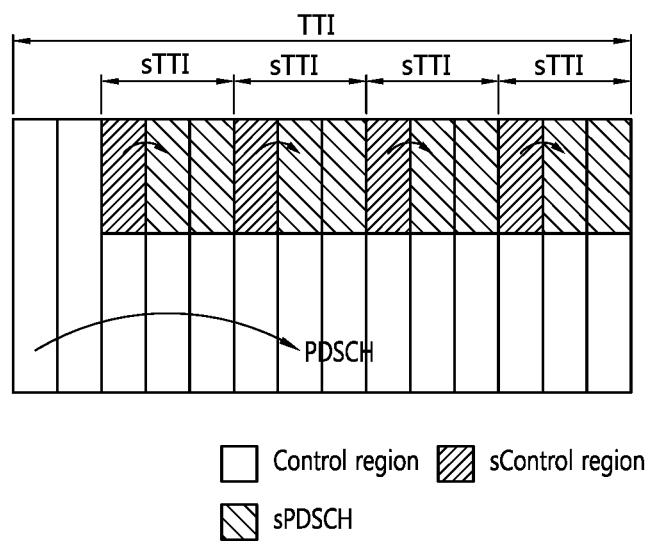
FIG. 4 shows an example of a sTTI structure having three OFDM symbols.

FIG. 4 shows an example of a sTTI structure having three OFDM symbols.

FIG. 4 shows an in-band dual TTI structure in which TTIs of different lengths are applied in the same frequency band based on frequency division duplex (FDD). A PDCCH of the conventional TTI schedules a PDSCH, and in a sPDCCH in each sTTI schedules a sPDSCH in the same sTTI. The PDCCH is included in a control region of the conventional TTI, and the sPDCCH is included in a control region of the sTTI (short control region: sCR).

Figure 5:
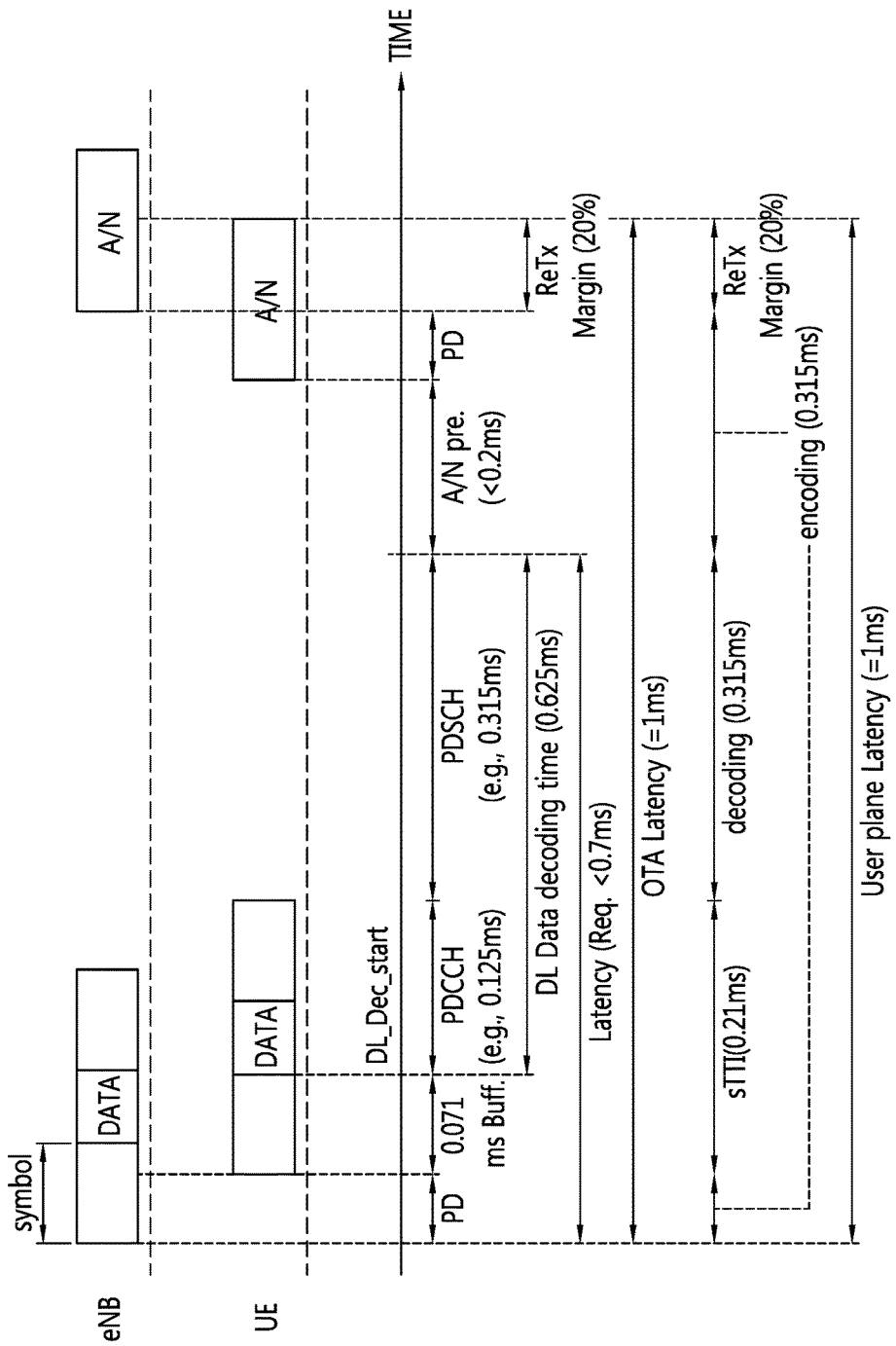
FIG. 5 shows that user-plane latency is 1 ms according to the sTTI structure having three OFDM symbols.

FIG. 5 shows that user-plane latency is 1 ms according to the sTTI structure having three OFDM symbols.

Referring to FIG. 5, as described above, when the sTTI obtained by reducing the conventional TTI is 0.21 ms, decoding/encoding time decreases to 0.315 ms in proportion to the shortened sTTI. Then, 20% margin for retransmission (ReTx margin) may be secured, thereby achieving a user-plane latency of 1 ms.

The present specification proposes a method for performing communication in a time division duplex (TDD)-based wireless communication system. TDD is advantageous in that it is possible to adjust uplink and downlink resources according to the amount of uplink and downlink traffic. However, when a low-latency service is applied, an uplink/downlink delay may increase due to a lack of uplink/downlink resources, and thus a low-latency requirement also needs to be satisfied.

Minimum user-plane latency in a 3GPP LTE TDD system is 5.18 ms, which does not satisfy a user-plane latency of 1 ms in the next-generation wireless communication system. In order to satisfy a user-plane latency of 1 ms, both uplink and downlink sTTIs need to be configured within a single subframe. Since a conventional terminal determines uplink or downlink based on the conventional TTI, it is impossible to deploy a terminal to which the next-generation wireless communication system is applied and the conventional terminal in the same subframe and to perform communications at the same time. Therefore, it is necessary to construct a TDD-based sTTI structure for low latency in a dedicated carrier.

The following assumptions are made to design TDD for a dedicated carrier. First, a stand-alone operation is possible. A stand-alone operation is an operation using a primary carrier. No LTE modem may be present for terminals specific to low-latency services. A frame structure in a stand-alone design can be extended into a secondary carrier structure.

Also, LTE carrier spacing is used. In order to provide universal low-latency services, it is advantageous to use LTE carrier spacing that supports wide coverage and high speed. That is. OFDM symbols in the conventional LTE system are used.

Further, in order to achieve a user-plane latency of 1 ms, a sTTI of three OFDM symbols or fewer is applied. This is because the goal of the next-generation wireless communication system to achieve low latency is a user-plane latency of 1 ms.

In addition, a variable channel configuration according to the amount of downlink/uplink traffic is applied. That is, the amount of downlink and uplink resources may be adjusted. The biggest motivation for adopting TDD is optimization in resource allocation according to downlink/uplink traffic.

Moreover, since the TDD structure set to even one OFDM symbol has a cell range of 10 km, the TDD structure is designed to have a guard period (GP) of at least one OFDM symbol or at most two OFDM symbols. When a downlink resource is changed to an uplink resource, a GP is disposed to provide an empty symbol.

Also, the TDD structure is designed assuming that a low-latency service is not applied in coverage wide enough to support an extended CP.

Based on the above-described assumptions, the structure of a subframe to which a sTTI is applied will be described below.

Figure 6:
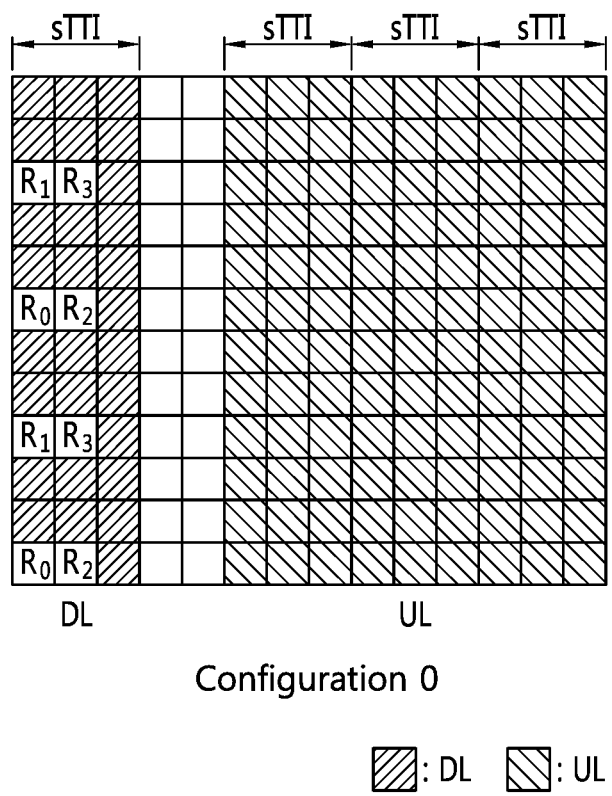
FIGS. 6 to 8 show configurations according to the sTTI structure having three OFDM symbols.
Figure 7:
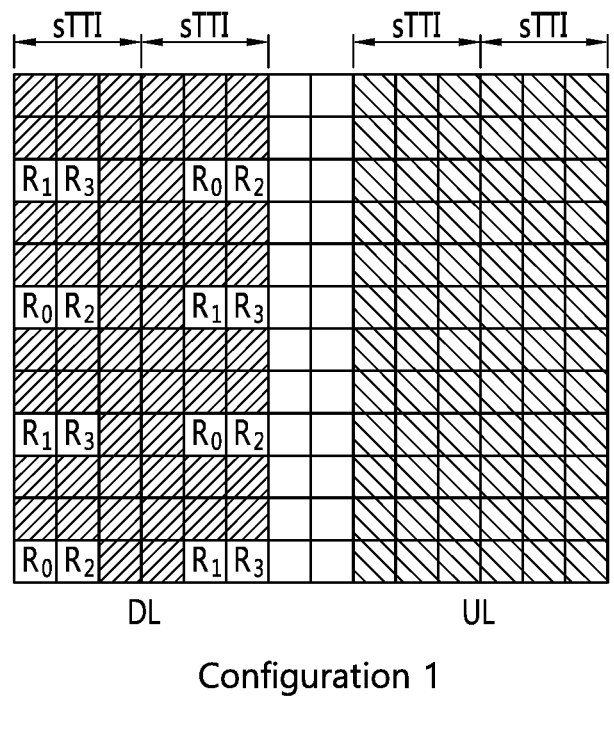
Figure 8:
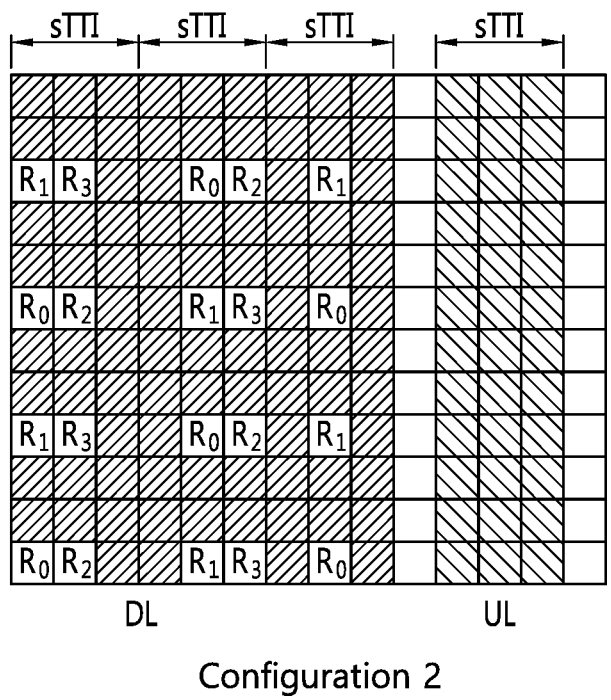

FIGS. 6 to 8 show configurations according to a sTTI structure having three OFDM symbols.

For the sTTI structure having three OFDM symbols, there may be three configurations. Since one subframe has 14 OFDM symbols, up to four sTTIs having three OFDM symbols may be disposed in one subframe. A GP may be disposed in the remaining two OFDM symbols between downlink OFDM symbols and uplink OFDM symbols.

FIGS. 6 to 8 show CRS arrangements in the case where there are four antenna ports, the number of antenna ports and a CRS arrangement may be changed without being limited thereto. For example, unlike in the drawings, when there are two antenna ports, $R_2$ and $R_3$ are not shown.

FIG. 6 shows a configuration 0 having one downlink sTTI and three uplink sTTIs. FIG. 7 shows a configuration 1 having two downlink sTTIs and two uplink sTTIs. FIG. 8 shows a configuration 2 having three downlink sTTIs and one uplink sTTI.

Different configurations among the configurations illustrated in FIGS. 6 to 8 may be designated for respective subframes in a radio frame and is designated via RRC. For example, different configurations may be designated such that a first subframe may have the configuration 0, a second subframe may have the configuration 1, and a third subframe may have a configuration 2.

Here, in FIG. 8, the last uplink sTTI is brought forward by one OFDM symbol, so that the GP has one OFDM symbol, which is for a transmitted signal in the foremost downlink sTTI to achieve a user-plane latency of 1 ms. Considering retransmission, an ACK/NACK of the transmitted signal in the foremost downlink sTTI needs to reach a BS within about 0.83 ms, but is difficult to reach the BS when the GP has two OFDM symbols. However, a transmitted signal in the last downlink sTTI cannot achieve a user-plane latency of 1 ms regardless of bringing the uplink sTTI forward.

FIGS. 9 to 12 show a format according to the sTTI structure having three OFDM symbols.

In TDD, there is a special subframe in a switch from a downlink subframe to an uplink subframe. Therefore, the sTTI structure also includes a special symbol serving as a special subframe. A special symbol is also called a special short subframe. FIGS. 9 to 12 show four formats for illustrating the arrangement of special symbols. Although FIGS. 9 to 12 show formats having two downlink sTTIs and two uplink sTTIs only, these formats are merely examples and do not limit the present invention.

Figure 9:
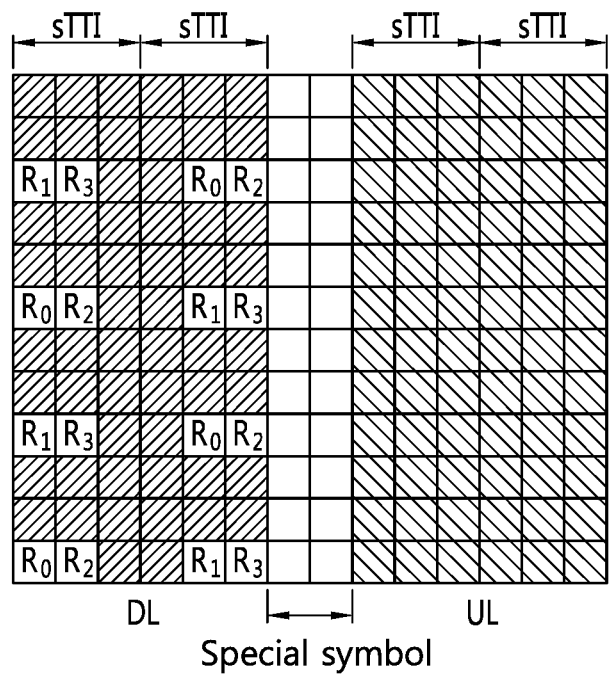
FIGS. 9 to 12 show a format according to the sTTI structure having three OFDM symbols.
Figure 10:
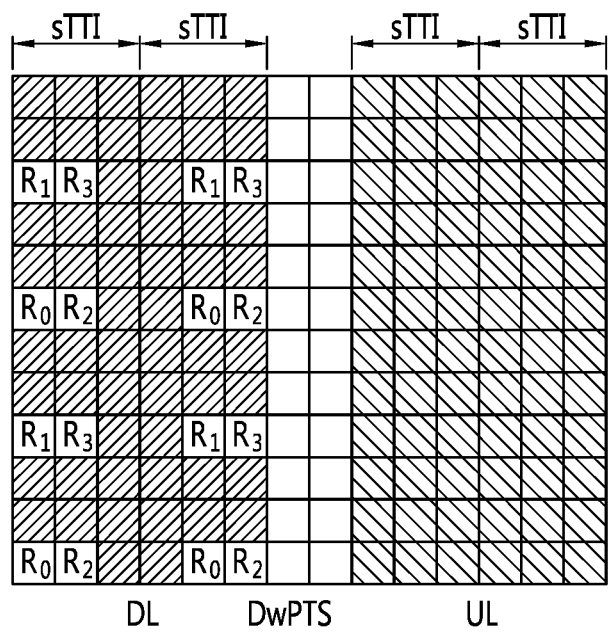
Figure 11:
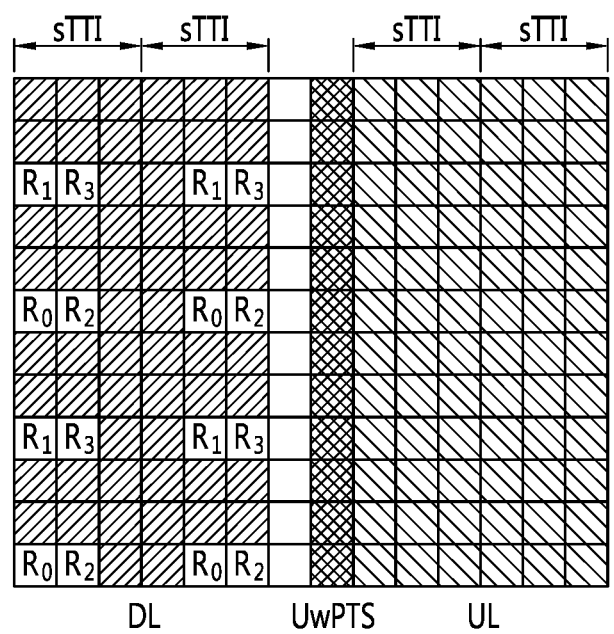
Figure 12:
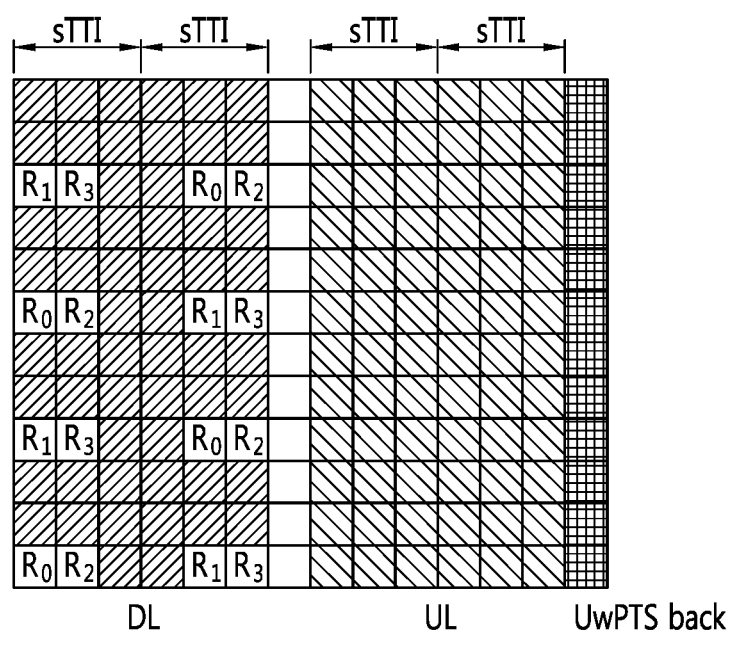

FIG. 9 shows a format 0 in which special symbols of two OFDM symbols include only a GP. FIG. 10 shows a format 1 in which special symbols of two OFDM symbols include a downlink pilot time slot (DwPTS) of one symbol and a GP of one symbol. FIG. 11 shows a format 2 in which special symbols of two OFDM symbols include a GP of one symbol and an uplink pilot time slot (UpPTS) of one symbol. FIG. 12 shows a format 3 in which special symbols of two OFDM symbols include a GP of one symbol and an UpPTS back of one symbol.

Table 1 below shows whether the format 0 to the format 3 for a special symbol include a DwPTS, a GP, an UpPTS, and an UpPTS back.

TABLE 1

| Format | DwPTS | GP | UpPTS | UpPTS back |
| --- | --- | --- | --- | --- |
| 0 | 0 | 2 | 0 | N/A |
| 1 | 1 | 1 | 0 | N/A |
| 2 | 0 | 1 | 1 | N/A |
| 3 | 0 | 1 | 0 | 1 |

The DwPTS can transmit a primary synchronization signal (PSS), a reference signal (RS), a control signal, or the like. The UpPTS can transmit a short random access channel (RACH), a sounding reference signal (SRS), or the like. The UpPTS back indicates whether the last symbol is used in the configuration 2 of FIG. 8 and can transmit a short RACH, a SRS, or the like.

The formats 0 to 2 are applied to the configuration 0 of FIG. 6 and the configuration 1 of FIG. 7, and only the formats 0 and 3 are applied to the configuration 2 of FIG. 8.

FIGS. 13 to 17 show configurations according to a sTTI structure having two OFDM symbols.

For the sTTI structure having two OFDM symbols, there may be five configurations. Since one subframe has 14 OFDM symbols, up to six sTTIs having two OFDM symbols may be disposed in one subframe. A GP may be disposed in the remaining two OFDM symbols between downlink OFDM symbols and uplink OFDM symbols.

FIGS. 13 to 17 show CRS arrangements in the case where there are four antenna ports, the number of antenna ports and the CRS arrangement may be changed without being limited thereto. For example, unlike in the drawings, when there are two antenna ports, $R_2$ and $R_3$ are not shown. Here, a half OFDM symbol may be applied as the foremost uplink symbol.

Figure 13:
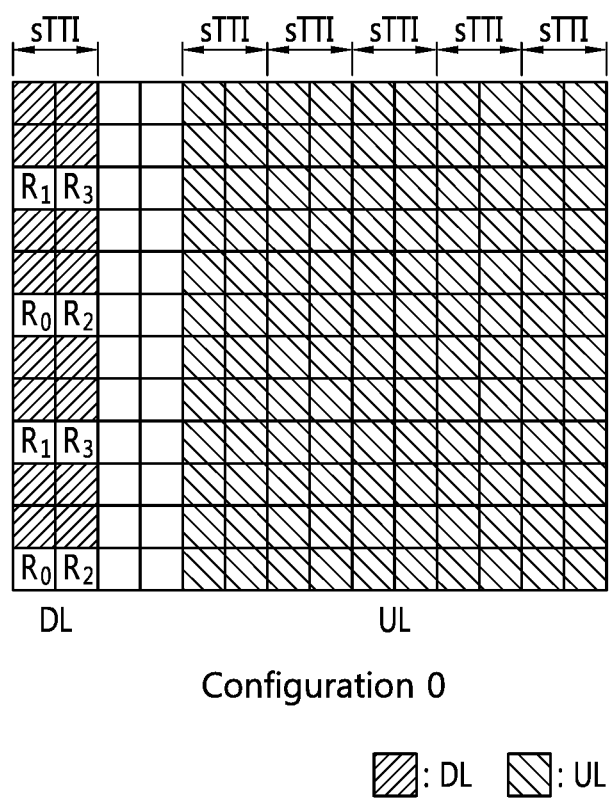
FIGS. 13 to 17 show configurations according to the sTTI structure having two OFDM symbols.
Figure 14:
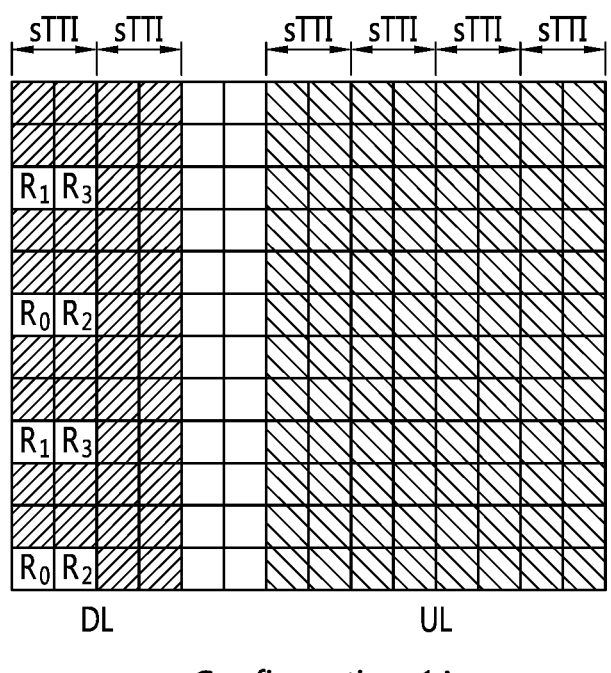
Figure 15:
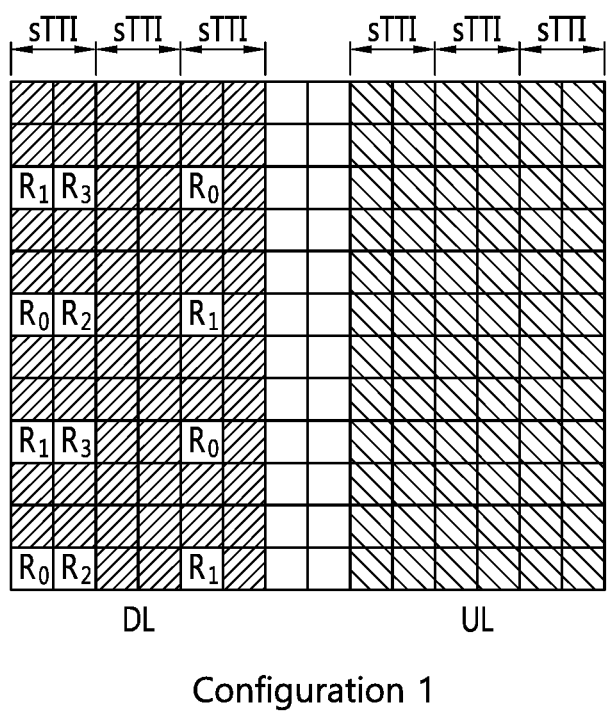
Figure 16:
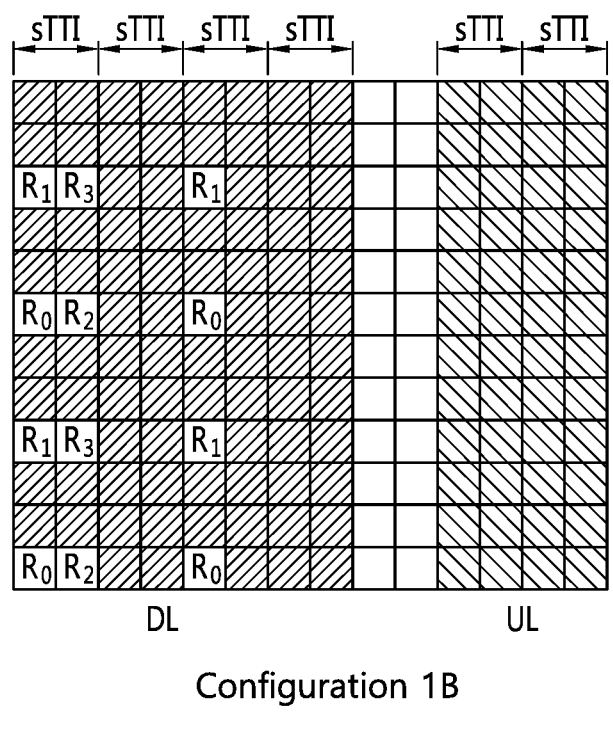
Figure 17:
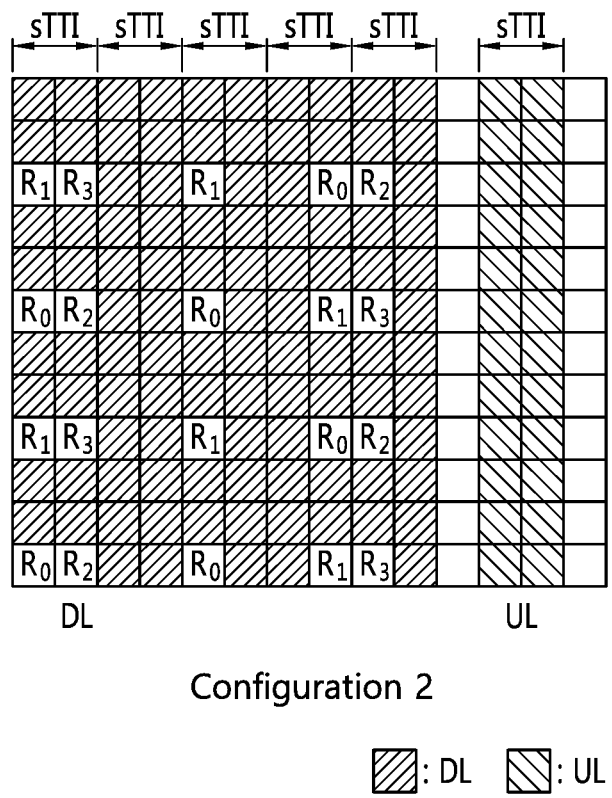

FIG. 13 shows a configuration 0 having one downlink sTTI and five uplink sTTI. FIG. 14 shows a configuration 1A having two downlink sTTIs and four uplink sTTIs. FIG. 15 shows a configuration 1 having three downlink sTTIs and three uplink sTTIs. FIG. 16 shows a configuration 1B having four downlink sTTIs and two uplink sTTIs. FIG. 17 shows a configuration 2 having five downlink sTTI and one uplink sTTI.

Different configurations among the configurations illustrated in FIGS. 13 to 17 may be designated for respective subframes in a radio frame and is designated via RRC. For example, different configurations may be designated such that a first subframe may have the configuration 0, a second subframe may have the configuration 1A, and a third subframe may have a configuration 1.

Here, in FIG. 17, the last uplink sTTI is brought forward by one OFDM symbol, so that the GP has one OFDM symbol, which is for a transmitted signal in the foremost downlink sTTI to achieve a user-plane latency of 1 ms. Considering retransmission, an ACK/NACK of the transmitted signal in the foremost downlink sTTI needs to reach a BS within about 0.83 ms, but is difficult to reach the BS when the GP has two OFDM symbols. However, a transmitted signal in the last downlink sTTI cannot achieve a user-plane latency of 1 ms regardless of bringing the uplink sTTI forward.

The sTTI structure having two OFDM symbols also includes a special symbol serving as a special subframe. A special symbol is also called a special short subframe. The four formats shown in Table 1 and FIGS. 9 to 12 are applied to the sTTI structure having two OFDM symbols as well as to the sTTI structure having three OFDM symbols.

The formats 0 to 2 are applied to the configuration 0 of FIG. 13, the configuration 1A of FIG. 14, the configuration 1 of FIG. 15 and the configuration 1 of FIG. 16, and only the formats 0 and 3 are applied to the configuration 2 of FIG. 17.

Hereinafter, a control signaling method using a short PDCCH (sPDCCH), a DwPTS, and an UpPTS in a sTTI structure having two or three OFDM symbols will be described.

First, a sPDCCH is located in the foremost OFDM symbol of a downlink sTTI and can be transmitted in all subcarriers or a specified subcarrier. Also, the sPDCCH schedules downlink resources. That is, the sPDCCH transmits scheduling information on downlink resources of the downlink sTTI including the sPDCCH.

Furthermore, the sPDCCH schedules uplink resources. Examples of scheduling uplink resources according to the sTTI structure having two or three OFDM symbols are illustrated below. Here, it is assumed that any designation scheme using information bits may be replaced with a scheme using cell-radio network temporary identifier (C-RNTI) masking.

<sTTI Structure Having Three OFDM Symbols>

Configuration 0 (one downlink sTTI, three uplink sTTIs): One sPDCCH transmits scheduling information on three uplink sTTIs. Therefore, two bits are needed to specify the uplink sTTIs in the format of the sPDCCH. Alternatively, the uplink sTTIs may be distinguished using C-RNTI masking. However, this scheme may increase a delay.

Configuration 1 (two downlink sTTIs, two uplink sTTIs): A sPDCCH in a first downlink sTTI transmits scheduling information on a first uplink sTTI. Also, a sPDCCH in a second downlink sTTI transmits scheduling information on a second uplink sTTI.

Configuration 2 (three downlink sTTIs, one uplink sTTI): sPDCCHs in the three downlink sTTIs transmit scheduling information on only one uplink sTTI. However, since there is only one uplink sTTI, no information for specifying an uplink sTTI is needed.

<sTTI Structure Having Two OFDM Symbols>

Configuration 0 (one downlink sTTI, five uplink sTTIs): A sPDCCH in one downlink sTTI transmits scheduling information on five uplink sTTIs. Three bits are needed to specify the five uplink sTTIs.

Configuration 1A (two downlink sTTIs, four uplink sTTIs): A sPDCCH in a first downlink sTTI transmits scheduling information on first and second uplink sTTIs. A sPDCCH in a second downlink sTTI transmits scheduling information on third and fourth uplink sTTIs. To this end, an information bit for specifying a one-bit uplink TTI is needed.

Configuration 1 (three downlink sTTIs, three uplink sTTIs): A sPDCCH in a first downlink sTTI transmits scheduling information on a first uplink sTTI. A sPDCCH in a second downlink sTTI transmits scheduling information on a second uplink sTTI. A sPDCCH in a third downlink sTTI transmits scheduling information on a third uplink sTTI.

Configuration 1B (four downlink sTTIs, two uplink sTTIs): sPDCCHs in first and second downlink sTTIs transmit scheduling information on a first uplink sTTI. sPDCCHs in third and fourth downlink sTTIs transmit scheduling information on a second uplink sTTI.

Configuration 2 (five downlink sTTIs, one uplink sTTI): sPDCCHs in the five downlink sTTIs transmit scheduling information on only one uplink sTTI. However, since there is only one uplink sTTI, no information bit for specifying an uplink sTTI is needed.

Hereinafter, a control signaling method using a DwPTS will be described.

One OFDM symbol is used for a DwPTS. Using the one OFDM symbol, the DwPTS transmits a synchronization signal, such as a primary synchronization signal (PSS) or a secondary synchronization signal (SSS). The DwPTS also transmits a reference signal (RS) using the one OFDM symbol.

In addition, the DwPTS may be utilized to transmit uplink scheduling information in order to reduce overhead in a sPDCCH. Particularly, the DwPTS may be utilized in the configuration 0 of sTTIs having three OFDM symbols and the configurations 0 and 1A of sTTIs having two OFDM symbols, because a small number of downlink sTTIs are used to schedule a large number of uplink sTTIs in the these configurations.

<sTTI Structure Having Three OFDM Symbols>

Configuration 0 (one downlink sTTI, three uplink sTTIs): A DwPTS transmits scheduling information on second and third uplink sTTIs. To this end, one information bit is needed to specify the uplink sTTIs in a sPDCCH format. A first uplink sTTI cannot be scheduled considering processing time and thus is excluded, because the interval between the symbol of the DwPTS and the symbol of the first uplink sTTI is too narrow.

Configuration 1 (two downlink sTTIs, two uplink sTTIs): A DwPTS transmits scheduling information on a second uplink sTTI. No information bit for specifying an uplink sTTI is needed. A first uplink sTTI cannot be scheduled considering processing time and thus is excluded.

<sTTI Structure Having Two OFDM Symbols>

Configuration 0 (one downlink sTTI, five uplink sTTIs): A DwPTS transmits scheduling information on second to fifth uplink sTTIs. Two bits are needed to specify the uplink sTTIs. A first uplink sTTI cannot be scheduled considering processing time and thus is excluded.

Configuration 1A (two downlink sTTIs, four uplink sTTIs): A DwPTS transmits scheduling information on second to fourth uplink sTTIs. Two bits are needed to specify the uplink sTTIs. A first uplink sTTI cannot be scheduled considering processing time and thus is excluded.

Configuration 1 (three downlink sTTIs, three uplink sTTIs): A DwPTS transmits scheduling information on second and third uplink sTTIs. One bit is needed to specify the uplink sTTIs. A first uplink sTTI cannot be scheduled considering processing time and thus is excluded.

Configuration 1B (four downlink sTTIs, two uplink sTTIs): A DwPTS transmits scheduling information on a second uplink sTTI. No information bit for specifying an uplink sTTI is needed. A first uplink sTTI cannot be scheduled considering processing time and thus is excluded.

As described above, a sPDCCH format for an uplink grant (UL grant) in a DwPTS is changed depending on the TDD configuration as in the foregoing embodiments. If a sTTI having two OFDM symbols and a sTTI having three OFDM symbols are designated through radio resource control (RRC), a sPDCCH format for an uplink grant in a DwPTS may be changed depending on the sTTI length.

Hereinafter, a control signaling method using an UpPTS will be described.

One OFDM symbol is also used for an UpPTS. Using the one OFDM symbol, the UpPTS may transmit sounding reference signal (SRS) information for uplink channel estimation. The UpPTS may also transmit a short RACH for performing uplink random access using the one OFDM symbol.

The following methods may be used to specify the uses of a DwPTS and an UpPTS.

First, the uses of a DwPTS and an UpPTS are semi-statically specified through RRC signaling.

In addition, the uses of a DwPTS and an UpPTS may be dynamically specified by each subframe by specifying a common sPDCCH. Here, the common sPDCCH is specified in the foremost downlink sTTI in a subframe and is used to specify whether to use a DwPTS and an UpPTS in the subframe and the uses of the DwPTS and the UpPTS.

Also, a common sPDCCH of a preceding subframe is used to specify whether to use a DwPTS and an UpPTS of a following subframe and the uses of the DwPTS and the UpPTS. This is for overcoming the disadvantage that time to decode a common sPDCCH may be insufficient in the configuration 0 having three OFDM symbols and the configurations 0 and 1A having two OFDM symbols.

A DwPTS of a preceding subframe is used to specify whether to use a DwPTS and an UpPTS of a following subframe and the uses of the DwPTS and the UpPTS, thereby reducing the overhead of a sPDCCH.

Hereinafter, a method for designating a TDD configuration for each subframe will be described. A TDD configuration may change for each cell. For example, as a specified TTI is for downlink in a first cell and is for uplink in a second cell adjacent to the first cell, interference may occur, which can be reduced by a method of designating a TDD configuration.

First, a method for designating a semi-static configuration is semi-statically designating different TDD configurations for respective cells. This method is more suitable, than a method for designating a dynamic configuration, to overcome interference that occurs in a cell-edge area due to different TDD configurations for respective cells. However, this method is disadvantageous in that a TDD configuration has a large number of guard periods (GPs) and thus is not quickly formed in the case of a rapid increase in low-latency uplink/downlink traffic, thus increasing delays due to a lack of resources. Low-latency packets may cause more fatal delays than existing services.

The method for designating the dynamic configuration has the reverse advantage/disadvantage to those of the method of designating the semi-static configuration. The advantage is that it is possible to minimize the occurrence of delay despite a rapid increase in low-latency traffic. The disadvantage is that interference between cells may occur by such a traffic increase.

The present specification proposes a method for designating a semi-dynamic configuration as a compromise between the foregoing two methods. This is a method in which a configuration is semi-dynamically designated for a particular subframe and a configuration is dynamically designated for a particular subframe. The semi-dynamic configuration method aims at minimizing the occurrence of low-latency packet delays by a shortage of resources and at minimizing interference between cells caused by neighboring cells having different TDD configurations.

The semi-dynamic configuration method proposed in the present specification is characterized in that TDD configurations are grouped such that downlink/uplink resources overlap as little as possible using a GP of a sTTI. The semi-dynamic configuration method proposed in the present specification may be broadly divided into a grouping configuration method and a semi-static subframe indication method.

Figure 19:
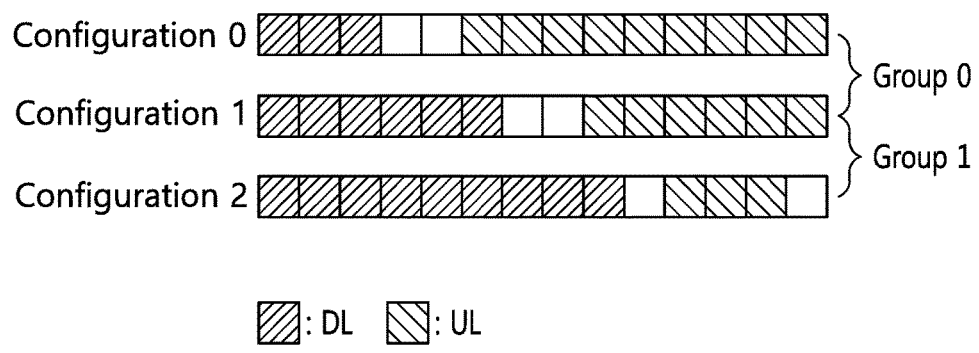
FIG. 19 shows a group of configurations according to the sTTI structure having three OFDM symbols.
Figure 20:
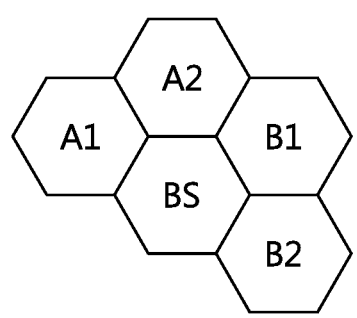
FIG. 20 shows that a group is assigned to particular subframes of a BS and a neighboring BS.

Hereinafter, the grouping configuration method will be described first. Regarding the grouping configuration method, FIGS. 18 and 19 show a method of setting a group, and FIG. 20 shows a method for transmitting information on a group.

Figure 18:
FIG. 18 shows a group of configurations according to the sTTI structure having two OFDM symbols.

FIG. 18 shows a group of configurations according to the sTTI structure having two OFDM symbols.

Referring to FIG. 18, the configurations 0, 1A, 1, 1B, and 2 based on a sTTI structure having two OFDM symbols are grouped into four groups (groups 0, 1, 2, and 3) such a downlink symbol and an uplink symbol overlap as little as possible. Grouping configurations such that a downlink symbol and an uplink symbol overlap as little as possible means that the downlink symbols and the uplink symbols do not overlap in all symbol periods of a subframe. For example, the configuration 0 and the configuration 1A are grouped into a group 0. The configuration 0 and the configuration 1A have only downlink symbols in first and second OFDM symbol periods. Also, the configuration 0 and the configuration 1A respectively have only GPs and only downlink symbols in third and fourth OFDM symbol periods. The configuration 0 and the configuration 1A respectively have only uplink symbols and only GPs in fifth and sixth OFDM symbol periods. Finally, the configuration 0 and the configuration 1A have only uplink symbols in seventh to fourteenth OFDM symbol periods. That is, any downlink symbol does not overlap with any uplink symbol during the first to fourteenth OFDM symbol periods. In other words, TDD configurations form a group using a GP of each TDD configuration in order to minimize interference between cells.

Grouping so that a downlink symbol and an uplink symbol overlap as little as possible can prevent cell interference between cells. For example, when a first cell has the configuration 0 in a particular subframe and a second cell has the configuration 0 in the particular subframe, there is no interference problem. However, when the configurations in the particular subframe for the first cell and the second cell are changed, an uplink resource and a downlink resource may overlap, so that interference may occur. Here, if the group 0 is designated for the particular subframe and the cells have a configuration only in the group 0, it is possible to solve the occurrence of interference. That is, when the first cell has the configuration 0 and the second cell has the configuration 1A for the particular subframe, any downlink symbol and any uplink symbol do not overlap with each other between the configuration 0 and the configuration 1A, thus preventing interference.

Also, a sPDCCH is included in a first OFDM symbol of each downlink sTTI. The sPDCCH of each downlink sTTI performs the foregoing function.

The configurations 0, 1, and 2 based on a sTTI structure having three OFDM symbols may also be grouped into groups (groups 0 and 1) such a downlink symbol and an uplink symbol overlap as little as possible. FIG. 19 shows a group of configurations according to the sTTI structure having three OFDM symbols.

Hereinafter, a method for reporting information indicating to which group a particular subframe is assigned is described.

FIG. 20 shows that a group is assigned to particular subframes of a BS and a neighboring BS.

First, the BS notifies a terminal of a group to which each subframe belongs through RRC. Each subframe is repeated with a period of n, where n=10. That is, a configuration is repeated per radio frame including ten subframes. n may be a fixed value, which may be reported via a system information block (SIB) or may be reported when a configuration to be used for a subframe is reported. A group is assigned to be cell-specific. Two bits are required to indicate a group of sTTI structures having two OFDM symbols in a particular subframe, because there are four groups in total. When a dynamic TDD configuration is used for a particular subframe without limiting a group. RRC signaling per subframe requires three bits for the five configurations (configurations 0, 1A, 1, 1B, and 2).

Further, the BS reports which TDD configurations a group has through a common L1 control channel. The common L1 control channel may be a common PDCCH. Since the maximum number of configurations in a group is two, one bit may be used to specify a configuration.

Referring to the left image of FIG. 20, when a BS is defined as a serving cell that is a reference cell, A1, A2, B1, and B2 are neighboring cells. The BS may be a serving BS, and A1. A2, B1, and B2 may be neighboring BSs. Among the neighboring cells. A1 and A2 are adjacent to each other, A2 and B1 are also adjacent to each other, and B1 and B2 are also adjacent to each other.

Here, a group for a particular subframe is semi-statically specified through coordination between the neighboring cells. Referring to the right image of FIG. 20, G3 is determined for a first subframe in coordination between BS, A1, and A2; G2 is determined for a second subframe in coordination between BS, B1, and B2; and G0 is determined for a third subframe in coordination between BS, A2, and B1. That is, different cells may participate in coordination in order to determine a group for each subframe.

In the right image of FIG. 20, blank spaces may be subframes for which each cell can arbitrarily determine a group. For example, the BS may arbitrarily determine G3 for a fourth subframe without coordination with A1, A2, B1, and B2. In addition, each cell may determine a group to be applied using channel quality information (CQI) on a terminal without coordination. For example, it is also possible to feed back channel information after emptying a specific resource element (RE) of a downlink sTTI and using the RE for measuring interference.

The BS may report a group for each subframe through RRC to a terminal belonging to the BS and terminals belonging to the neighboring BSs. The BS may assign a group to all subframes within a radio frame. That is, the BS may assign G3, G2, G0, G3, G3, G1, G3. G2, G3, and G3 for subframes in order and may report the groups to the terminal belonging to the BS and the terminals belonging to the neighboring BSs. Referring to the right image of FIG. 20, fourth, fifth, ninth, and tenth subframes are assigned groups that the BS arbitrarily determines without coordination between cells.

Further, the BS reports TDD configurations included in a group through a common L1 control channel to the terminal belonging to the BS and the terminals belonging to the neighboring BSs. The common L1 control channel may be a common PDCCH.

A specific embodiment of the grouping configuration method is described below.

First, according to the definition of terms, a first BS is a BS of a serving cell and a second BS is a BS of a cell adjacent to the serving cell. Here, the first BS may be the BS, and the second BS may be A1, A2, B1, or B2. A terminal may be a terminal included in the coverage of the first BS or may be a terminal included in the coverage of the second BS.

The first BS sets a group by grouping a first configuration, in which at least one downlink symbol and at least one uplink symbol are arranged in each subframe, and a second configuration, in which at least one downlink symbol and at least one uplink symbol are arranged in each subframe. That is, one subframe corresponds to one transmission time interval (TTI), and one TTI includes a sTTI as a time unit obtained by subdividing the TTI. Here, a subframe is a TDD subframe, and a sTTI is defined as a scheduling unit for data transmission in order to achieve a user-plane latency of 1 ms. Therefore, in the first and second configurations provided by the subframe, a downlink sTTI including at least one downlink symbol and an uplink sTTI including at least one uplink symbol may be arranged. Also, the first and second configurations include a guard period (GP) between the at least one downlink symbol and the at least one uplink symbol.

Here, the first and second configurations need to be grouped such that the downlink symbols and the uplink symbols do not overlap with each other in a specific symbol period. The downlink symbols and the uplink symbols may be separated not to overlap with each other using the GPs in the first configuration and the second configuration. Specifically, the first and second configurations need to be grouped such that the at least one downlink symbol of the first configuration and the at least one downlink symbol of the second configuration are arranged in a first symbol period, the GP of the first configuration and the at least one downlink symbol of the second configuration are arranged in a second symbol period, the at least one uplink symbol of the first configuration and the GP of the second configuration are arranged in a third symbol period, and the at least one uplink symbol of the first configuration and the at least one uplink symbol of the second configuration are arranged in a fourth symbol period. The first symbol period, the second symbol period, the third symbol period, and the fourth symbol period are combined into a symbol period of one subframe.

For example, the group 0 may be set such that the first configuration is the configuration 0 and the second configuration is the configuration 1A. Further, the group 3 may be set such that the first configuration is the configuration 1B and the second configuration is the configuration 2. In each group, configurations may be grouped such that a downlink symbol and an uplink symbol do not overlap with each other using a GP. The group 3 includes the configuration 1B and the configuration 2. In first to eighth symbol periods, both the configuration 1B and the configuration 2 have downlink symbols. In ninth and tenth symbol periods, the configuration 1B has GPs and the configuration 2 has downlink symbols. In eleventh and fourteenth symbol periods, the configuration 1B has uplink symbols and the configuration 2 has GPs. In twelfth and thirteenth symbol periods, both the configuration 1B and the configuration 2 have uplink symbols. That is, a downlink symbol and a uplink symbol do not overlap in any symbol period in the subframe.

Next, the first BS transmits, to a terminal, information indicating the group used for at least one of a plurality of subframes. The group is a group set in the previous step. The group may be designated for the at least one subframe through coordination between the first BS and the second BS. Information indicating that the group is designated for the at least one subframe is semi-statically transmitted via RRC. That is, the first BS designates and reports the group for each of the plurality of subframes to the terminal.

For example, the BS may designate the group 3 for a particular subframe in coordination with A1 or A2. The BS may report information indicating the group 3 directly to A1 or A2 or may report the information indicating the group 3 to a terminal belonging to A1 or a terminal belonging to A2.

The first BS transmits, to the terminal, information indicating a configuration for the at least one subframe to be used for the terminal among the first configuration and the second configuration in the group. The configuration for the at least one subframe is dynamically reported through a common control channel. That is, the first configuration or the second configuration, in which no interference can occur, is designated for a particular subframe, thereby preventing interference between the serving cell of the first BS and the neighboring cell of the second BS.

For example, the BS may report information indicating one of the configuration 1B and the configuration 2 in the group 3 for the particular subframe to the terminal belonging to A1 or the terminal belonging to A2. Further, the BS may report information indicating a configuration directly to A1 or A2.

Figure 22:
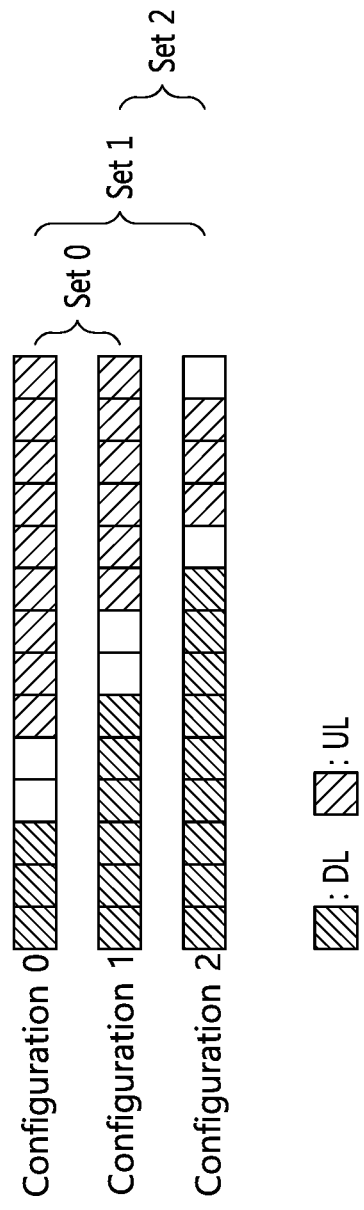
FIG. 22 shows a set of configurations according to the sTTI structure having three OFDM symbols.
Figure 23:
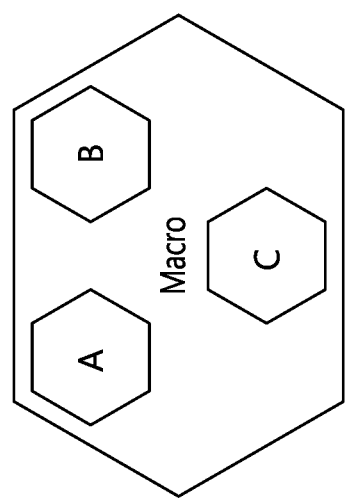
FIG. 23 shows that a configuration or set is designated for particular subframes of a BS of a macrocell and a BS of a small cell.

Next, the semi-static subframe indication method will be described. Regarding the semi-static subframe indication method, FIGS. 21 and 22 show a method of setting a set of configurations, and FIG. 23 shows a method of transmitting information on a set.

Figure 21:
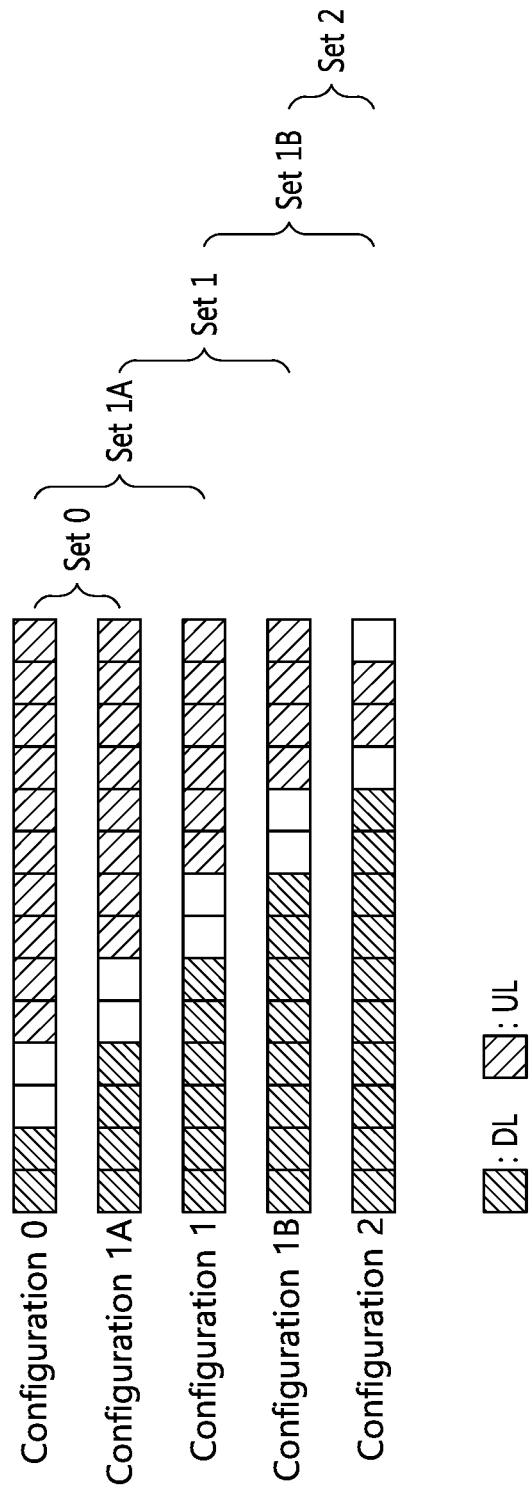
FIG. 21 shows a set of configurations according to the sTTI structure having two OFDM symbols.

FIG. 21 shows a set of configurations according to the sTTI structure having two OFDM symbols.

First, it is assumed in the semi-static subframe indication method that there is a serving cell and a neighboring cell. The serving cell may be a macrocell, and the neighboring cell may be a small cell. The serving cell selects a subframe in which a TDD configuration is semi-statically changed and reports the index and the configuration of the subframe to the neighboring cell. Here, to change a TDD configuration semi-statically designated, the serving cell needs to give notification in advance to the neighboring cell. For a subframe in which a TDD configuration is not semi-statically designated, a TDD configuration may be dynamically changed.

The neighboring cell may determine a set for dynamically determining a TDD configuration using the TDD configuration of the semi-statically designated subframe. The set refers to a collection of the TDD configuration of the semi-statically designated subframe and TDD configurations, which have a downlink symbol and an uplink symbol respectively not overlapping with an uplink symbol and a downlink symbol in the TDD configuration of the semi-statically designated subframe.

Referring to FIG. 21, as the TDD configuration of the semi-statistically designated subframe is the configuration 1A, the neighboring cell determines a set 1A by grouping the configuration 1A and the configuration 0 and the configuration 1, which have a downlink symbol and an uplink symbol respectively not overlapping with an uplink symbol and a downlink symbol in the configuration 1A. That is, when a particular subframe of the serving cell is a semi-static subframe and has a TDD configuration of the configuration 1A, the neighboring cell may dynamically set, for the particular subframe, one TDD configuration among TDD configurations in the set 1A. Here, the TDD configuration for the particular subframe of the neighboring cell will be one of the configuration 0, the configuration 1A, and the configuration 1. According to the semi-static subframe indication method, similarly to the grouping configuration method, TDD configurations form a set using a GP of each TDD configuration in order to minimize interference between cells.

Also, a sPDCCH is included in a first OFDM symbol of each downlink sTTI. The sPDCCH of each downlink sTTI performs the foregoing function.

The configurations 0, 1, and 2 based on a sTTI structure having three OFDM symbols may also be grouped into sets (sets 0 and 1) such a downlink symbol and an uplink symbol overlap as little as possible. FIG. 22 shows a set of configurations according to the sTTI structure having three OFDM symbols.

Hereinafter, a method for reporting information indicating that a serving cell designates a TDD configuration for a particular subframe and which set a neighboring cell designates is described.

FIG. 23 shows that a configuration or set is designated for particular subframes of a BS of a macrocell and a BS of a small cell.

Referring to the left image of FIG. 23, there are a macrocell and small cells A, B, and C included in the macrocell.

First, the BS of the macrocell reports the position of a semi-static subframe and a TDD configuration of the semi-static subframe to the BSs of the small cells A. B. and C. The BS of each small cell determines a set for a semi-static subframe using the information received from the BS of the macrocell. Referring to the right image of FIG. 23, first, second, fifth, sixth, ninth, and tenth subframes are semi-static subframes of the macrocell. For example, the BS of the macrocell reports to the BSs of the small cells A, B. and C that the second subframe is a semi-static subframe and the TDD configuration of the second subframe is the configuration 1A. Upon receiving this information, the BSs of the small cells A, B, and C form the set 1A (S1A) for the second subframe. As a result, the BSs of the small cells A. B, and C may dynamically designate one of the TDD configurations in the set 1A (S1A) for the second subframe.

In the right image of FIG. 23, blank spaces may be subframes for which each cell can arbitrarily determine a set. For example, the small cells may arbitrarily determine a set 2 (S2) for a fourth subframe without coordination with the macrocell. In addition, each cell may determine a group to be applied using channel quality information (CQI) on a terminal without coordination. For example, it is also possible to feed back channel information after emptying a specific resource element (RE) of a downlink sTTI and using the RE for measuring interference.

The BSs of the small cells A, B and C may report a set for each subframe through RRC to a terminal belonging to each of the cells. The BSs of the small cells may assign a group to all subframes within a radio frame. That is, the BSs of the small cells A, B. and C may assign S0, S1A, S1, S2, S1B, S1, S2, S1, S2, and S1 for subframes in order and may report the sets to the terminal belonging to each of the cells. Referring to the right image of FIG. 23, third, fourth, seventh, and eighth subframes are assigned sets that the BSs of small cells A. B and C arbitrarily determine without coordination between cells.

Further, the BSs of the small cells A, B. and C report TDD configurations included in a set through a common L1 control channel to the terminal belonging to each of the cells. The common L1 control channel may be a common PDCCH. Since the maximum number of configurations in a group is three, two bits may be used to specify a configuration.

The grouping configuration method and the semi-static subframe indication method are compared as follows.

First, the grouping configuration method may be used mostly when neighboring macrocells apply different TDD configurations or when neighboring small cells in an area crowded with small cells apply different TDD configurations. That is, the grouping configuration method is a method for preventing interference between equal and neighboring cells.

An advantage of the grouping configuration method is that all neighboring cells can dynamically designate a configuration for a particular subframe. A disadvantage, however, is that the number of selectable TDD configurations in a group is smaller than that in the semi-static subframe indication method.

The semi-static subframe indication method may be used mostly when a macro cell and a small cell apply different TDD configurations. The main feature is such that a macrocell semi-statically designates a TDD configuration for a particular subframe, while a small cell can dynamically select one of TDD configurations in a set for a particular subframe. The semi-static subframe indication method is based on the fact that because a macrocell has a smaller traffic change than a small cell, performance degradation in the macro cell is smaller than that in the small cell even if the macrocell semi-statically changes a TDD configuration. Accordingly, a small cell has more options in selecting a configuration. Here, the semi-static subframe indication method is suitable for a case where small cells are spaced apart from each other.

An advantage of the semi-static subframe indication method is that the number of selectable TDD configurations in a set is greater than that in the grouping configuration method. A disadvantage, however, is that a macrocell needs to semi-statically designate a TDD configuration for a particular subframe.

Here, there may be a plurality of small cells in one macrocell, and particular small cells among the plurality of small cells may be adjacent to each other. In this case, a hybrid semi-dynamic TDD configuration method of simultaneously applying the grouping configuration method and the semi-static subframe indication method may be employed. Hereinafter, the hybrid semi-dynamic TDD configuration method will be described.

Figure 24:
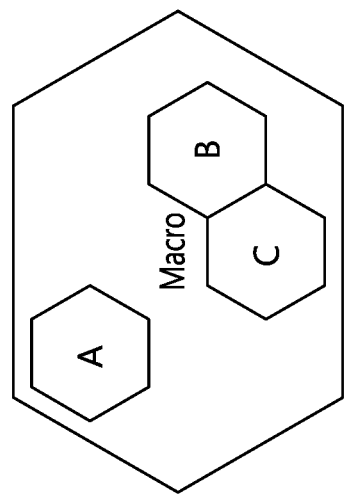
FIG. 24 shows that a configuration, a group, or a set is designated for particular subframes of a BS of a macrocell and a BS of a small cell.

FIG. 24 shows that a configuration, a group, or a set is designated for particular subframes of a BS of a macrocell and a BS of a small cell.

Referring to the left image of FIG. 24, there are a macrocell and small cells A. B, and C included in the macrocell, wherein the small cells B and C are adjacent to each other.

First, the BS of the macrocell may designate a semi-static TDD configuration for a particular subframe, because the macrocell has a small intra-cell traffic change. The BS of the macrocell reports the position of the semi-static subframe and the TDD configuration of the semi-static subframe to BSs of the small cells A, B and C.

The small cell A having no neighboring small cell uses the semi-static subframe indication method. That is, the BS of the small cell A determines a set for a semi-static subframe using the information received from the BS of the macrocell. Accordingly, the small cell A may dynamically select a TDD configuration from the set having a larger number of TDD configurations than a group. For example, referring to the right image of FIG. 24, first, second, fifth, sixth, ninth, and tenth subframes are semi-static subframes of the macrocell. For example, the BS of the macrocell reports to the BS of the small cell A that the second subframe is a semi-static subframe and the TDD configuration for the second subframe is the configuration 1A. Then, the BS of the small cell A forms a set 1A (S1A) for the second subframe. Accordingly, the BS of the small cell A may dynamically designate one of the TDD configurations in the set 1A (S1A) for the second subframe.

The small cells B and C having a neighboring small cell use the grouping configuration method for a particular subframe for which a TDD configuration is semi-statically designated. That is, the small cells B and C may select one in a group including the semi-statically designated TDD configuration of the macrocell. Here, the neighboring cells recognize the existence of each other and thus sets a group through coordination. For example, referring to the right image of FIG. 24, when the sixth and tenth subframes of the macrocell are semi-static subframes and the TDD configuration is designated as the configuration 1, the small cells B and C may select and use a group 1 (G1) or a group 2 (G2). The small cells B and C select the group 1 (G1) for the sixth subframe, while the small cell B and C select the group 2 (G2) for the tenth subframe. Since it is difficult to solve an interference problem between neighboring small cells only using the semi-static subframe indication method, the grouping configuration method is used for neighboring small cells to solve this problem.

The BSs of the small cells A, B and C may report a set or group for each subframe through RRC to a terminal belonging to each of the cells. Specifically, the BSs of the small cells A, B and C may specify through RRC whether a set is used for each subframe, whether a group is used for each subframe, or whether there is a restriction as to a set or group. A corresponding value is signaled using an event-triggering format, and this procedure may be omitted if there is no change. For example, it is assumed that 00 indicates the use of a set, 01 indicates the use of a group, and 10 indicates no restriction as to a group or a set. Then, referring the right image of FIG. 24, the BS of the small cell B may report 01, 01, 01, 01, 10, 01, 01, 00, 10, 01, and 01 to the terminal of the small cell B.

Further, the BSs of the small cells A, B, and C report TDD configurations included in a set or group to the terminals belonging to the respective cells through a common L1 control channel. The common L1 control channel may be a common PDCCH. Two bits are required to specify a TDD configuration in the set. One bit is required to specify a TDD configuration in the group. When there is no restriction as to a group or set, three bits are required to specify a TDD configuration.

Hereinafter, a hybrid automatic retransmit request (HARQ) resource allocation method according to the sTTI structure will be described.

When a TDD configuration dynamically changes for each subframe, a collision may occur in uplink retransmission resources. For example, when a TDD configuration having three uplink sTTIs is dynamically changed to a TDD configuration having one uplink sTTI, the number of uplink resources is reduced in the next subframe, causing a collision in uplink retransmission resources.

To solve this problem, two approaches are proposed. First, a retransmission resource allocation method using an N-bit physical HARQ indicator channel (PHICH) is proposed. Second, a retransmission resource allocation method using an uplink (UL) grant is proposed. The first method enables shorter decoding time for a control signal and involves lower overheads of the control signal than the second method. The second method enables more flexible scheduling than the first method.

Therefore, the present specification proposes a method in which the first method is basically applied and the second method is used when a collision occurs in a resource despite the use of the first method.

First, an HARQ resource allocation method according to the sTTI structure having three OFDM symbols will be described.

The TDD configurations based on the sTTI structure having three OFDM symbols are shown in FIGS. 6 to 8. A collision in resources is mostly likely to occur in uplink retransmission when an nth subframe has the configuration 0 and an (n+1)th subframe has the configuration 2, that is, when different terminals transmit signals in the same resource blocks (RBs) of the first, second, and third uplink sTTIs of the configuration 0 in the nth subframe and all of the terminals need retransmission in the (n+1) th subframe. When the signals transmitted in the first, second, and third uplink sTTIs of the nth subframe need to be retransmitted, retransmission needs to be performed at the same resource position. However, since the (n+1)th subframe includes only one uplink sTTI, the signals to be retransmitted may congest the (n+1)th subframe, thus causing a collision. Here, the retransmission resource may be scheduled using a PHICH or UL grant, thereby preventing a collision.

Suppose that the index of an RB transmitting a signal of a terminal is k. Suppose that the terminal is allocated two PHICH resources, and a PHICH can be expressed in two bits. The two bits for resource allocation are used as follows.

00: Retransmission is performed in the kth RB previously allocated.
01: Retransmission is performed in the f(k−1)th RB.
10: Retransmission is performed in the f(k+1)th RB.
11: No allocation via a PHICH. That is, retransmission is performed through a UL grant.

f(x) may be set as follows.

1) The RB allocated to the terminal in the initial transmission is highly likely to be an RB having the best channel for the terminal. Therefore, f(x) may be set such that the terminal is allocated a neighboring RB for retransmission, in which case f(x)=x.

2) Further, the reason why the terminal failed in reception in the initial transmission may be channel aging. In this case, a remote RB may be allocated to successfully perform retransmission. Here, f(x)=x+M, where M is a random constant.

The setting method 1) is suitable when the terminal has a slow channel change, while the setting method 2) is suitable when the terminal has a fast channel change. Generally, the characteristics of the channel for the terminal change slowly. A method to be used among 1) and 2) may be designated through RRC. When the setting method 2) is designated, M may be additionally designated.

A retransmission mode using a UL grant is necessary for the following case. For example, suppose that there are three terminals transmitting signals in a kth RB and three terminals transmitting signals in a (k+1)th RB during three uplink sTTIs. When five or more terminals among the foregoing terminals fail in transmission, it may be most efficient to perform retransmission using a UL grant. Retransmission using a UL grant is also necessary to adapt to a changed channel condition.

Next, an HARQ resource allocation method according to the sTTI structure having two OFDM symbols will be described.

The TDD configurations based on the sTTI structure having two OFDM symbols are shown in FIGS. 13 to 17. A collision in resources is most likely to occur in uplink retransmission when an nth subframe has the configuration 0 and an (n+1)th subframe has the configuration 2, that is, when different terminals transmit signals in the same resource blocks (RBs) of the first, second, third, fourth, and fifth uplink sTTIs of the configuration 0 in the nth subframe and all of the terminals need retransmission in the (n+1) th subframe. When the signals transmitted in the first, second, third, fourth, and fifth uplink sTTIs of the nth subframe need to be retransmitted, retransmission needs to be performed at the same resource position. However, since the (n+1)th subframe includes only one uplink sTTI, the signals to be retransmitted may congest the (n+1)th subframe, thus causing a collision. Here, the retransmission resource may be scheduled using a PHICH or UL grant, thereby preventing a collision.

Suppose that the index of an RB transmitting a signal of a terminal is k. Suppose that the terminal is allocated two PHICH resources, and a PHICH can be expressed in two bits. The two bits for resource allocation are used as follows.
    00: Retransmission is performed in the kth RB previously allocated.
    01: Retransmission is performed in the f(k−1)th RB.
    10: Retransmission is performed in the f(k+1)th RB.
    11: No allocation via a PHICH. That is, retransmission is performed through a UL grant.
    f(x) may be set as follows.
    1) The RB allocated to the terminal in the initial transmission is highly likely to be an RB having the best channel for the terminal. Therefore, f(x) may be set such that the terminal is allocated a neighboring RB in retransmission, in which case f(x)=x.
    2) Further, the reason why the terminal fails in reception in the initial transmission may be channel aging. In this case, a remote RB may be allocated to successfully perform retransmission. Here, f(x)=x+M, where M is a random constant.

The setting method 1) is suitable when the terminal has a slow channel change, while the setting method 2) is suitable when the terminal has a fast channel change. Generally, the characteristics of the channel for the terminal change slowly. A method to be used among 1) and 2) may be designated through RRC. When the setting method 2) is designated, M may be additionally designated.

Suppose that a PHICH can be expressed in three bits. The three bits for resource allocation are used as follows.
    000: Retransmission is performed in the kth RB.
    001: Retransmission is performed in the (k−1)th RB.
    010: Retransmission is performed in the (k−2)th RB.
    011: Reserved
    100: Reserved
    101: Retransmission is performed in the (k+1)th RB.
    110: Retransmission is performed in the (k+2)th RB.
    111: Retransmission is performed via a UL grant.

Next, an HARQ resource allocation method according to the FDD-based sTTI structure will be described.

Figure 25:
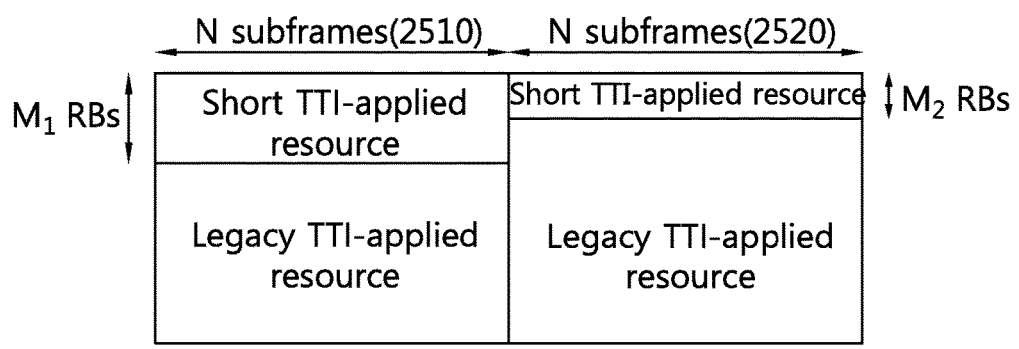
FIG. 25 shows an example of an FDD-based sTTI structure.

FIG. 25 shows an example of an FDD-based sTTI structure.

FIG. 25 illustrates an example of performing in-band multiplexing and changing uplink sTTI-applied resources by N subframes, in which a sTTI is applied to $M_1$ RBs in N preceding subframes 2510 and the sTTI is applied to $M_2$ RBs in N following subframes 2520. Although FIG. 25 shows that RBs are contiguously arranged. RBs to which sTTI is applied may be arranged at random intervals. Further, FIG. 25 may be performed not only in uplink but also in downlink.

In FIG. 25, it can also be expected that a resource collision may occur in uplink retransmission due to a decrease in the number of RBs, to which the uplink sTTI is applied, in a subframe. Specifically, suppose that when an uplink sTTI is applied to $M_1$ RBs in the N preceding subframes 2510, a random terminal performs initial transmission in a K1th RB ($K_1$=1, 2 . . . . . $M_1$). When the number of RBs to which the uplink sTTI is applied in the N subframes 2520 is reduced to $M_2$, the terminal performs retransmission in the $K_2$th RB. Here, $K_2$=floor(($K_1 M_2$)/$M_1$). For example, when $M_1$=10 is reduced to $M_2$=5, a collision may occur in retransmissions by up to two terminals.

To solve this problem, suppose that the terminal is allocated two PHICH resources, and a PHICH can be expressed in two bits. The two bits for resource allocation are used as follows.
    00: Retransmission is performed in the $K_2$th RB.
    01: Retransmission is performed in the f($K_2$−1)th RB.
    10: Retransmission is performed in the f($K_2$+1)th RB.
    11: Retransmission is performed through a UL grant.
    f(x) may be set as follows.
    1) When RBs to which an uplink sTTI is applied are arranged at equal intervals across the entire band and the number of RBs decreases in the next subframe, an RB mapped as a retransmission resource is located at a position adjacent to an RB used for initial transmission. Therefore, when a channel change over time is insignificant, the RB used for retransmission has a channel characteristic similar to that of the RB used for initial transmission. Generally, an RB allocated to a terminal in initial transmission is highly likely to be an RB having the best channel for the terminal. Therefore, f(x) may be set such that the terminal is allocated a neighboring RB in retransmission, in which case f(x)=x.
    2) Also, when RBs to which an uplink sTTI is applied are contiguously arranged and the number of RBs decreases in the next subframe, an RB mapped as a retransmission resource is located at a position different from that of an RB used in initial transmission. Therefore, a remote RB may be allocated as a retransmission resource, so that the RB used for retransmission has various channel characteristics, thereby successfully achieving retransmission. Here, f(x)=x+M, where M is a random constant.

The setting method 1) is suitable for a case where RBs to which an uplink sTTI is applied are arranged at equal intervals across the entire band, while the setting method 2) is suitable for a case where RBs to which an uplink sTTI is applied are contiguously arranged. Generally, the characteristics of the channel for a terminal change slowly. A method to be used among 1) and 2) may be designated through RRC. When the setting method 2) is designated, M may be additionally designated. Further, instead of explicitly designating the setting method 1) or the setting method 2), it is possible to implicitly designate one of the setting method 1) and the setting method 2) depending on the arrangement of RBs to which an uplink sTTI is applied.

Figure 26:
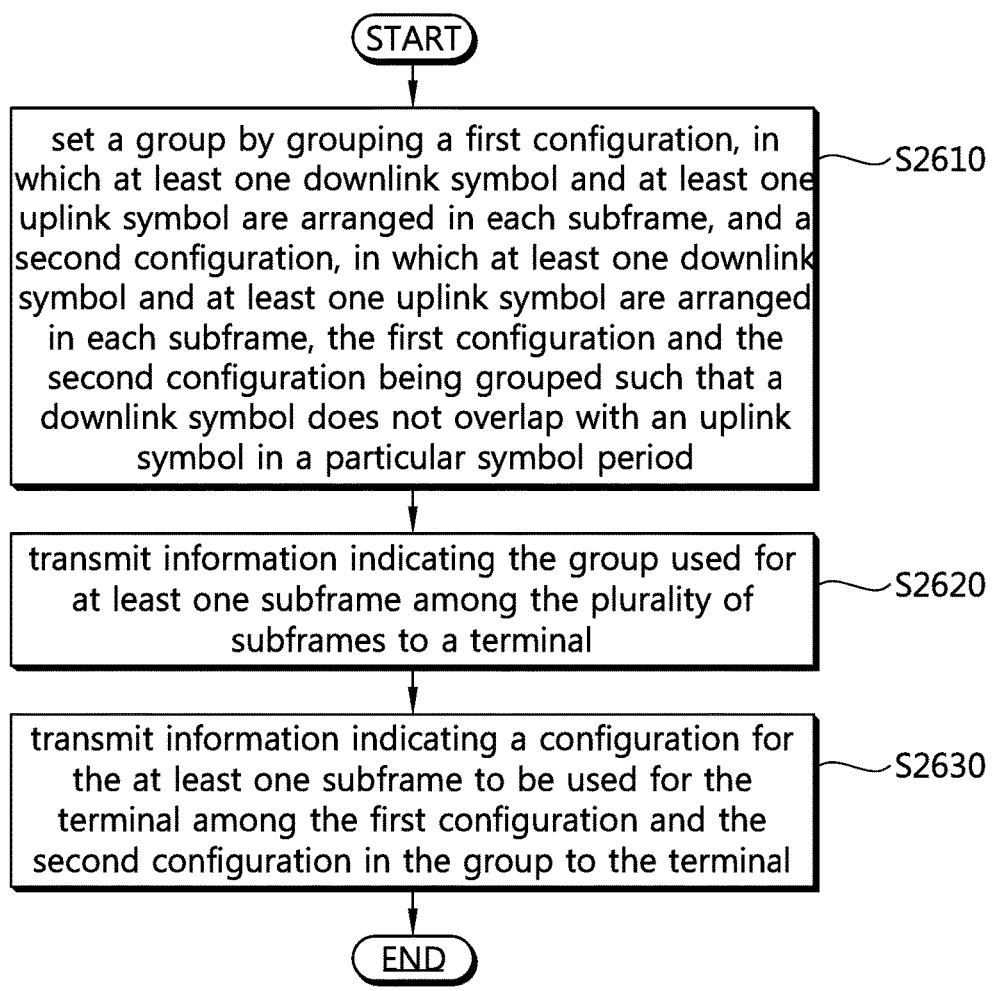
FIG. 26 is a flowchart showing a procedure for performing communication using a plurality of subframes according to an embodiment of the present specification.

FIG. 26 is a flowchart showing a procedure for performing communication using a plurality of subframes according to an embodiment of the present specification.

First, according to the definition of terms, a first BS is a BS of a serving cell and a second BS is a BS of a cell adjacent to the serving cell. A terminal may be a terminal included in the coverage of the first BS or may be a terminal included in the coverage of the second BS.

In step S2610, the first BS sets a group by grouping a first configuration, in which at least one downlink symbol and at least one uplink symbol are arranged in each subframe, and a second configuration, in which at least one downlink symbol and at least one uplink symbol are arranged in each subframe. That is, one subframe corresponds to one TTI, and one TTI includes a sTTI as a time unit obtained by subdividing the TTI. Here, a subframe is a TDD subframe, and a sTTI is defined as a scheduling unit for data transmission in order to achieve a user-plane latency of 1 ms. Therefore, in the first and second configurations provided by the subframe, a downlink sTTI including at least one downlink symbol and an uplink sTTI including at least one uplink symbol may be arranged. Also, the first and second configurations include a guard period (GP) between the at least one downlink symbol and the at least one uplink symbol.

Here, the first and second configurations need to be grouped such that the downlink symbols and the uplink symbols do not overlap with each other in a specific symbol period. The downlink symbols and the uplink symbols may be separated not to overlap with each other using the GPs in the first configuration and the second configuration. Specifically, the first and second configurations need to be grouped such that the at least one downlink symbol of the first configuration and the at least one downlink symbol of the second configuration are arranged in a first symbol period, the GP of the first configuration and the at least one downlink symbol of the second configuration are arranged in a second symbol period, the at least one uplink symbol of the first configuration and the GP of the second configuration are arranged in a third symbol period, and the at least one uplink symbol of the first configuration and the at least one uplink symbol of the second configuration are arranged in a fourth symbol period. The first symbol period, the second symbol period, the third symbol period, and the fourth symbol period are combined into a symbol period of one subframe.

In step S2620, the first BS transmits, to a terminal, information indicating the group used for at least one of a plurality of subframes. The group is a group set in step S2610. The group may be designated for the at least one subframe through coordination between the first BS and the second BS. Information indicating that the group is designated for the at least one subframe is semi-statically transmitted via radio resource control (RRC). That is, the first BS designates and reports a group for each of the plurality of subframes to the terminal.

In step S2630, the first BS transmits, to the terminal, information indicating a configuration for the at least one subframe to be used for the terminal among the first configuration and the second configuration in the group. The configuration for the at least one subframe is dynamically reported through a shared control channel. That is, the first configuration or the second configuration, in which no interference can occur, is designated for a particular subframe, thereby preventing interference between the serving cell of the first BS and the neighboring cell of the second BS.

Figure 27:
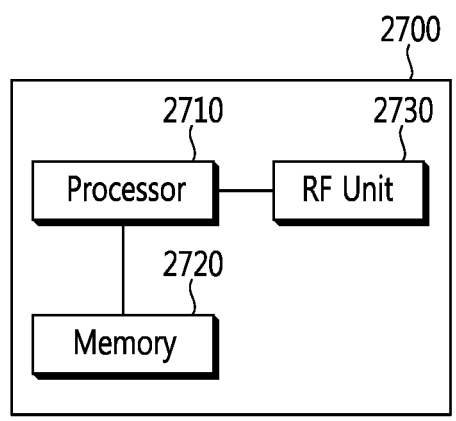
FIG. 27 is a block diagram showing an apparatus for wireless communication for implementing an embodiment of the present specification.

FIG. 27 is a block diagram showing an apparatus for wireless communication for implementing an embodiment of the present specification.

An apparatus 2700 for wireless communication includes a processor 2710, a memory 2720 and a radio frequency (RF) unit 2730.

The processor 2710 may be configured to implement proposed functions, procedures and/or methods described in this description. Layers of the radio interface protocol may be implemented in the processor 2710. The processor 2710 may handle a procedure explained above. The memory 2720 is operatively coupled with the processor 2710, and the RF unit 2730 is operatively coupled with the processor 2710.

The processor 2710 may include application-specific integrated circuit (ASIC), other chipset, logic circuit and/or data processing device. The memory 2720 may include read-only memory (ROM), random access memory (RAM), flash memory, memory card, storage medium and/or other storage device. The RF unit 2730 may include baseband circuitry to process radio frequency signals. When the embodiments are implemented in software, the techniques described herein can be implemented with modules (e.g., procedures, functions, and so on) that perform the functions described herein. The modules can be stored in memory 2720 and executed by processor 2710. The memory 2720 can be implemented within the processor 2710 or external to the processor 2710 in which case those can be communicatively coupled to the processor 2710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Furthermore, the technical concepts in the described embodiments may be identically applied, and embodiments in which the number of subframes and the number of special symbols within a radio frame are differently defined may be included in the technical scope of this specification.

What is claimed is:

1. A method for performing communication using a plurality of subframes in a time division duplex (TDD)-based wireless communication system, the method comprising:

setting, by a first base station (BS), a group by grouping a first configuration, in which at least one downlink symbol and at least one uplink symbol are arranged in each subframe, and a second configuration, in which at least one downlink symbol and at least one uplink symbol are arranged in each subframe, the first configuration and the second configuration being grouped such that a downlink symbol does not overlap with an uplink symbol in a particular symbol period;

transmitting, by the first BS, information indicating the group used for at least one subframe among the plurality of subframes to a terminal; and transmitting, by the first BS, information indicating a configuration for the at least one subframe to be used for the terminal among the first configuration and the second configuration in the group to the terminal.

2. The method of claim 1, wherein the first configuration and second configuration comprise a guard period (GP) between the at least one downlink symbol and the at least one uplink symbol.

3. The method of claim 2, wherein the first configuration and second configuration are grouped such that the at least one downlink symbol of the first configuration and the at least one downlink symbol of the second configuration are arranged in a first symbol period, the GP of the first configuration and the at least one downlink symbol of the second configuration are arranged in a second symbol period, the at least one uplink symbol of the first configuration and the GP of the second configuration are arranged in a third symbol period, and the at least one uplink symbol of the first configuration and the at least one uplink symbol of the second configuration are arranged in a fourth symbol period.

4. The method of claim 2, wherein the GP comprises only one symbol, and an uplink pilot time slot (UpPTS) back is comprised in a last symbol of the first configuration or in a last symbol of the second configuration.

5. The method of claim 1, wherein the group is designated for the at least one subframe through coordination between the first BS and a second BS adjacent to the first BS.

6. The method of claim 5, further comprising:
transmitting, by the first BS, information indicating that the group is designated for the at least one subframe among the plurality of subframes to the second BS; and
transmitting, by the first BS, information indicating a configuration for the at least one subframe to be used for the terminal among the first configuration and the second configuration in the group to the second BS,
wherein the terminal is comprised in coverage of the second BS.

7. The method of claim 1, wherein the group is designated for the at least one subframe through channel quality information (CQI) on the terminal.

8. The method of claim 1, wherein information indicating that the group is designated is semi-statically transmitted through radio resource control (RRC).

9. The method of claim 1, wherein the information indicating the configuration to be used for the terminal is dynamically transmitted through a common control channel.

10. The method of claim 1, wherein one subframe among the plurality of subframes corresponds to a one transmission time interval (TTI), and a downlink control channel received during a downlink short TTI (sTTI) comprised in the one TTI schedules an unlink channel received during an uplink sTTI comprised in the one TTI.

11. A base station (BS) performing communication using a plurality of subframes in a time division duplex (TDD)-based wireless communication system, the BS comprising:
a radio frequency (RF) unit to transmit or receive a radio signal; and
a processor connected to the RF unit,
wherein the processor:
sets a group by grouping a first configuration, in which at least one downlink symbol and at least one uplink symbol are arranged in each subframe, and a second configuration, in which at least one downlink symbol and at least one uplink symbol are arranged in each subframe, the first configuration and the second configuration being grouped such that a downlink symbol does not overlap with an uplink symbol in a particular symbol period;
transmits information indicating the group used for at least one subframe among the plurality of subframes to a terminal; and
transmits information indicating a configuration for the at least one subframe to be used for the terminal among the first configuration and the second configuration in the group to the terminal.

* * * * *